United States Patent
Wu Won et al.

(10) Patent No.: US 12,511,806 B2
(45) Date of Patent: Dec. 30, 2025

(54) SYSTEMS AND METHODS FOR CREATING AND USING DEFORMABLE TEXT SHAPES

(71) Applicant: Canva Pty Ltd, Surry Hills (AU)

(72) Inventors: Kevin Andrew Wu Won, Sydney (AU); Abiodun Quadri Adekunle, Surry Hills (AU); Arran Peter Lomas, Surry Hills (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 18/883,654

(22) Filed: Sep. 12, 2024

(65) Prior Publication Data

US 2025/0005834 A1 Jan. 2, 2025

Related U.S. Application Data

(63) Continuation of application No. 18/495,921, filed on Oct. 27, 2023.

(30) Foreign Application Priority Data

Nov. 1, 2022 (AU) ................................ 2022263478

(51) Int. Cl.
*G06T 11/60* (2006.01)
*G06F 3/04842* (2022.01)
(Continued)

(52) U.S. Cl.
CPC .......... *G06T 11/60* (2013.01); *G06F 3/04842* (2013.01); *G06F 3/04845* (2013.01); *G06T 11/203* (2013.01); *G06T 2200/24* (2013.01)

(58) Field of Classification Search
CPC ... G06T 11/60; G06T 11/203; G06T 2200/24; G06T 11/206; G06T 11/20;
(Continued)

(56) References Cited

U.S. PATENT DOCUMENTS 6,919,888 B1 * 7/2005 Perani ..................... G06T 17/20
345/420
7,385,612 B1 6/2008 Peterson
(Continued)

FOREIGN PATENT DOCUMENTS

CN 113302659 A 8/2021
JP 2013532852 A 8/2013
(Continued)

OTHER PUBLICATIONS

"9-slice scaling" Wikipedia page, https://en.wikipedia.org/wiki/9-slice_scaling (last visited Oct. 19, 2022), pp. 1-2.
(Continued)

*Primary Examiner* — Chante E Harrison
(74) *Attorney, Agent, or Firm* — GrowIP Law Group LLC

(57) ABSTRACT

Described herein is a computer implemented method. The method includes receiving a user input selecting a deformable text shape that is defined by shape data that includes path data, slice data, viewbox data, and textbox data. A further user input that resizes the viewbox of the deformable text shape is received, and in response resized shape data is calculated by calculating resized path data and resized textbox data. A resized deformable text shape is then displayed in accordance with the resized shape data.

20 Claims, 13 Drawing Sheets

(51) Int. Cl.
*G06F 3/04845* (2022.01)
*G06T 11/20* (2006.01)

(58) Field of Classification Search
CPC ............. G06F 3/04842; G06F 3/04845; G06F 2203/04806; G06F 40/103; G06F 40/106
See application file for complete search history.

(56) References Cited

U.S. PATENT DOCUMENTS

| | | | |
|---|---|---|---|
| 9,685,143 | B2 | 6/2017 | Sato et al. |
| 10,878,641 | B1* | 12/2020 | Peterson ................. G06T 7/149 |
| 11,657,511 | B2 | 5/2023 | Ross et al. |
| 2006/0119601 | A1 | 6/2006 | Finlayson |
| 2014/0049787 | A1 | 2/2014 | Jacob et al. |
| 2014/0104266 | A1 | 4/2014 | Stone et al. |
| 2014/0193047 | A1 | 7/2014 | Grosz et al. |
| 2016/0231914 | A1 | 8/2016 | Sinn et al. |
| 2018/0053281 | A1 | 2/2018 | Parag et al. |
| 2020/0098086 | A1* | 3/2020 | Peterson ................. G06T 11/60 |
| 2020/0098087 | A1* | 3/2020 | Peterson ............. G06F 3/04812 |
| 2020/0098091 | A1* | 3/2020 | Peterson ................. G06T 7/13 |
| 2020/0175101 | A1 | 6/2020 | Holmberg-Nielsen et al. |
| 2022/0122258 | A1* | 4/2022 | Kumawat ............... G06T 11/60 |
| 2023/0244825 | A1* | 8/2023 | Bansal ................... G06F 30/17 703/1 |
| 2024/0331220 | A1* | 10/2024 | Ham ...................... G06F 30/12 |

FOREIGN PATENT DOCUMENTS

| | | | |
|---|---|---|---|
| WO | 2006087415 A1 | 8/2006 | |
| WO | 2016058646 A1 | 4/2016 | |
| WO | WO-2023158429 A1 * | 8/2023 | ........... G06T 11/001 |
| WO | WO-2024091344 A1 * | 5/2024 | ........... G06F 1/1616 |

OTHER PUBLICATIONS

Adobe, "Create text and text frames", Adobe.com, published Jan. 17, 2022, https://helpx.adobe.com/au/indesign/using/creating-text-text-frames.html (pp. 1-14).
Examination Report No. 1 for Australian Patent Application No. 2022263478 mailed on Jul. 4, 2023 (pp. 1-8).
Examination Report No. 1 for Australian Patent Application No. 2022263506 mailed Jul. 4, 2023 (pp. 1-5).
Matharoo, G. S., "Slick Interfaces With 9-Slice—Gamemaker Studio 2.3.2", gamemaker.io, published Apr. 1, 2021, https://gamemaker.io/en/blog/slick-interfaces-with-9-slice (pp. 1-12).
List of References accompanying Non-Final Office Action mailed Nov. 20, 2024 for U.S. Appl. No. 18/495,921, p. 1.

* cited by examiner

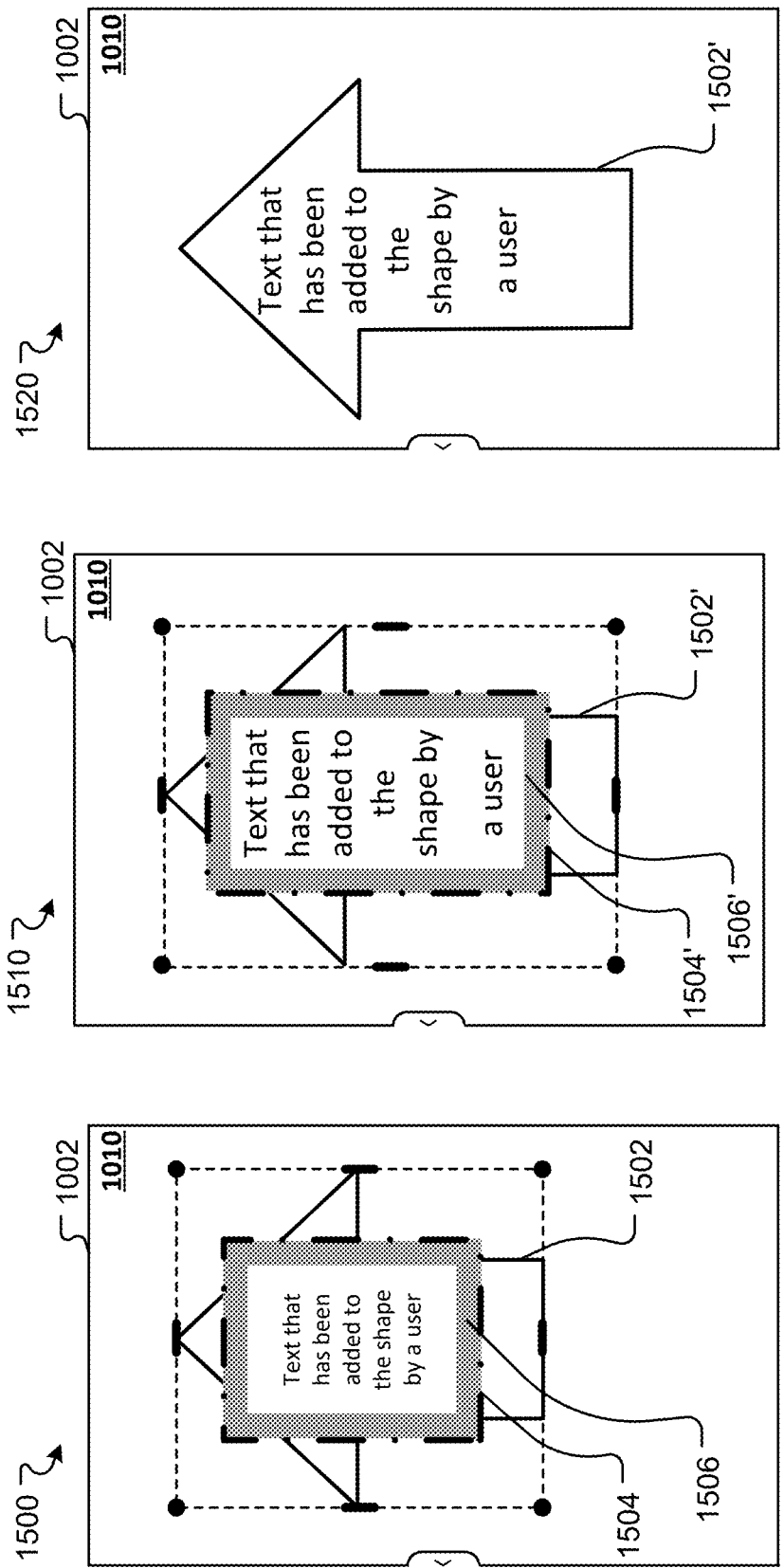

SYSTEMS AND METHODS FOR CREATING AND USING DEFORMABLE TEXT SHAPES

CROSS-REFERENCE TO RELATED APPLICATION

This application is a U.S. Continuation Patent Application that claims priority to U.S. Non-Provisional patent application Ser. No. 18/495,921, filed on Oct. 27, 2023, that claims priority to Australian Patent Application No. 2022263478, filed Nov. 1, 2022, which are each hereby incorporated by reference in their entirety.

TECHNICAL FIELD

Aspects of the present disclosure are directed to systems and methods for creating and using deformable text shapes.

BACKGROUND

Many graphic design applications allow users to create designs by adding one or more shapes to a canvas or page. Once a shape has been added to the canvas, such applications typically provide functions by which a user can edit the shape. Such functions may include functions to associate text with a shape and to resize the shape.

When a shape that has had text added to it is resized, determining the impact of that resizing on the text—and the resulting appearance of the resized shape—can be non-trivial, particularly where the resizing is non-uniform and the shape's aspect ratio changes.

SUMMARY

Described herein is a computer implemented method for creating a deformable text shape. the method including: receiving first user input defining a base shape, the base shape being a deformable shape that is defined by base shape data, the base shape data including path data defining an appearance of the base shape and slice data defining a slice box for the base shape; receiving second user input defining a textbox; generating textbox data defining the textbox; and creating the deformable text shape by associating the textbox data with the base shape data.

Also described herein is a computer implemented method for resizing a deformable text shape, the method including: receiving a shape selection user input selecting the deformable text shape, the deformable text shape defined by shape data that includes path data defining an original appearance of the deformable text shape, slice data defining an original slice box for the deformable text shape, viewbox data defining an original viewbox for the deformable text shape, and textbox data defining an original textbox for the deformable text shape; receiving a shape resizing user input that resizes the viewbox of the deformable text shape; in response to the shape resizing user input, calculating resized shape data by calculating resized path data and calculating resized textbox data; and displaying a resized deformable text shape in accordance with the resized shape data.

Also described herein is a computer implemented method for resizing a deformable text shape, the method including: receiving a shape selection user input selecting the deformable text shape, the deformable text shape defined by shape data that includes path data defining an original appearance of the deformable text shape, slice data defining an original slice box for the deformable text shape, viewbox data defining an original viewbox for the deformable text shape, and textbox data defining an original textbox for the deformable text shape, the original textbox defining an available text entry area; receiving a text entry input defining text; determining whether the text fits within the available text entry area; and in response determining that the text does not fit within the available text entry area, resizing the deformable text shape to provide a resized textbox that accommodate the text by: calculating resized shape data by calculating resized path data and calculating resized textbox data; and displaying a resized deformable text shape in accordance with the resized shape data.

BRIEF DESCRIPTION OF THE DRAWINGS

In the drawings:

FIG. 15 depicts examples of user interfaces displayed during a resizing operation.

Where different figures include the same or similar features, the same reference numerals are used to indicate those features.

Figure 1:
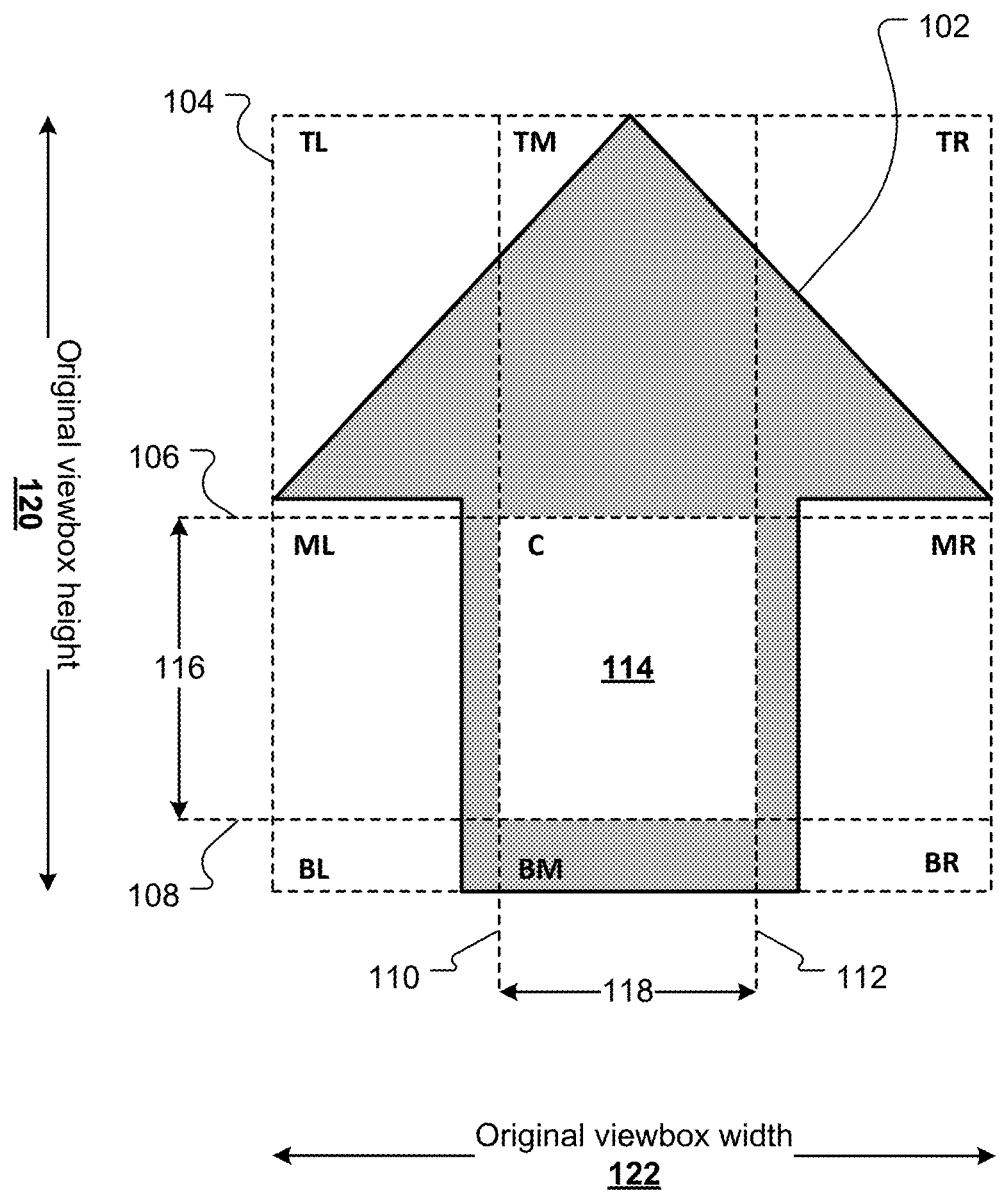
FIG. 1 depicts an example deformable shape.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present invention as defined by the appended claims.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

The present disclosure is directed to systems and methods for creating and using deformable text shapes.

Deformable Shapes

In the context of the present disclosure, a deformable shape is a shape that can be resized or deformed. In many design applications, deformation or resizing of shape can be achieved by either entering an explicit height and/or width for the shape, or by moving one or more drag handles associated with the shape. For example, interaction with a corner drag handle may be limited to resizing the shape uniformly (i.e. so the shape's width and height are adjusted proportionally and the original aspect ratio of the shape is maintained). In contrast, moving an edge drag handle may result in the shape being non-uniformly resized (or deformed) by changing the size of the shape in one dimension only. For example, if a vertical edge drag handle (e.g. a left or right edge drag handle) is moved, the shape's width will be adjusted while the shape's height remains the same, while if a horizontal edge drag handle (e.g. a top or bottom edge drag handle) is moved, the shape's height will be adjusted while the shape's width remains the same.

In the present disclosure, the word deformation (or deforming or other variants) is used to indicate non-uniform resizing of a shape-i.e. an operation in which the original aspect ratio of the shape is not maintained.

One mechanism or system for providing deformable shapes is the 9-slice system (and 9-slice scaling/transformation). In the present disclosure, therefore, a 9-slice shape is one example of a deformable shape.

Details of the 9-slice system and 9-slice transformation will be known to a person skilled in the art, however in order to provide context a brief overview will be provided with reference FIG. 1 which depicts an example of a deformable shape 102.

A 9-slice shape is defined by shape data that includes path data, viewbox data, and slice data.

For a given deformable shape, the path data describes the original appearance of the shape; i.e. how the shape appears before any editing or adjustment. The path data describes a path in an initial coordinate space. In the present embodiments, a shape's path data is a Scalable Vector Graphic (SVG) path which can define a path via various primitive commands such as moveto, lineto, cubic Bezier, quadratic Bezier, elliptical arc, and/or "closepath" commands. A shape's path data may be alternatively defined.

In the present embodiments, all coordinate spaces (e.g. the initial coordinate space of a deformable shape or deformable text shape, and the coordinate space for a design page of a design being created and the canvas representing that page) are Cartesian planes with x coordinates increasing from left to right and y coordinates increasing from top to bottom. Direction references made herein are, therefore, made with reference to this coordinate space—e.g. up=negative y direction, down=positive y direction, left=negative x direction, right=positive x direction. The embodiments as described, however, may be adapted for alternative coordinate spaces.

The path data for shape 102 defines an arrow-shaped path 102 (the arrow shaded grey here for ease of identification). The arrow shaped path 102 may be defined in various ways, for example a SVG path such as:

<path d="M 100 0 L 200 100 L 150 100 L 150 200
L 50 200 L 50 100 L 0 100 Z"/>

Note that while this SVG path does define an arrow shape, it is provided by way of example only and does not define the exact same arrow shape 102 of FIG. 1).

For a given deformable shape the view box data defines a rectangular bounding box (e.g. 104 of FIG. 1) that is the shape's drawable area. In the present embodiments, viewbox data includes origin data (e.g. x and y coordinates indicating a top-left corner), a width, and a height. For example, if the viewbox data (x, y, width, height)=(10, 10, 20, 20), then if a path specifies the coordinate (20, 20), that represents a point at the centre of the viewbox. If a path goes outside of the view box, however (e.g. to coordinate (5, 5) or (35, 35)), then it is truncated.

The slice data for a given deformable shape defines four logical slice boundaries: an upper slice boundary (or slice min y) 106; a lower slice boundary (or slice max y) 108; a left slice boundary (or slice min x) 110; and a right slice boundary (or slice max x) 112.

In turn, the four slice boundaries defined by the slice data (together with the view box data) define nine logical slice regions which will be referred to as: the top-left (TL) region; the top-middle (TM) region; the top-right (TR) region; the middle-left (ML) region; the central (or middle-middle) (C) region; the middle-right (MR) region; the bottom-left (BL) region; the bottom-middle (BM) region; and the bottom-right (BR) region. The central region is also referred to as the slice box 114 (indicated in this example by the unfilled/white rectangle).

The slice data may define the four logical boundaries—and, therefore, the logical regions and slice box 114—in various ways. In the present embodiments, the slice data for a given deformable shape includes the following values: a slice top coordinate (e.g. the y coordinate of the slice top 106), a slice left coordinate (e.g. the x coordinate of the slice left 110), a slice height (e.g. 116, which when added to the upper slice boundary provides the y coordinate of the lower slice boundary 108), and a slice width (e.g. 118, which when added to the left slice boundary provides the x coordinate of the right slice boundary 112). As an alternative example, the slice data may define two y coordinates (upper slice boundary 106 and lower slice boundary 108) and two x coordinates (left slice boundary 110 and right slice boundary 112).

The slice data (and logical regions defined thereby) are used to determine how the coordinate space (and, therefore, the appearance of the original shape) is transformed in response to a resizing operation. For example, and generally speaking: portions of the shape 102 in the corner regions (TL, TR, BL, BR) are not changed when the shape is resized; portions of the shape 102 in the middle vertical slice (e.g. the TM, C, and BM regions) are transformed when the shape 102 is scaled (e.g. when the shape is enlarged or shrunk but its original aspect ratio is maintained) or deformed horizontally (e.g. by increasing or decreasing the width of the shape without increasing its height); portions the shape 102 in the middle horizontal slice (e.g. the ML, C, and MR regions) are transformed when the shape 102 is scaled or deformed vertically (e.g. by increasing or decreasing the height of the shape without increasing its width).

Figure 2:
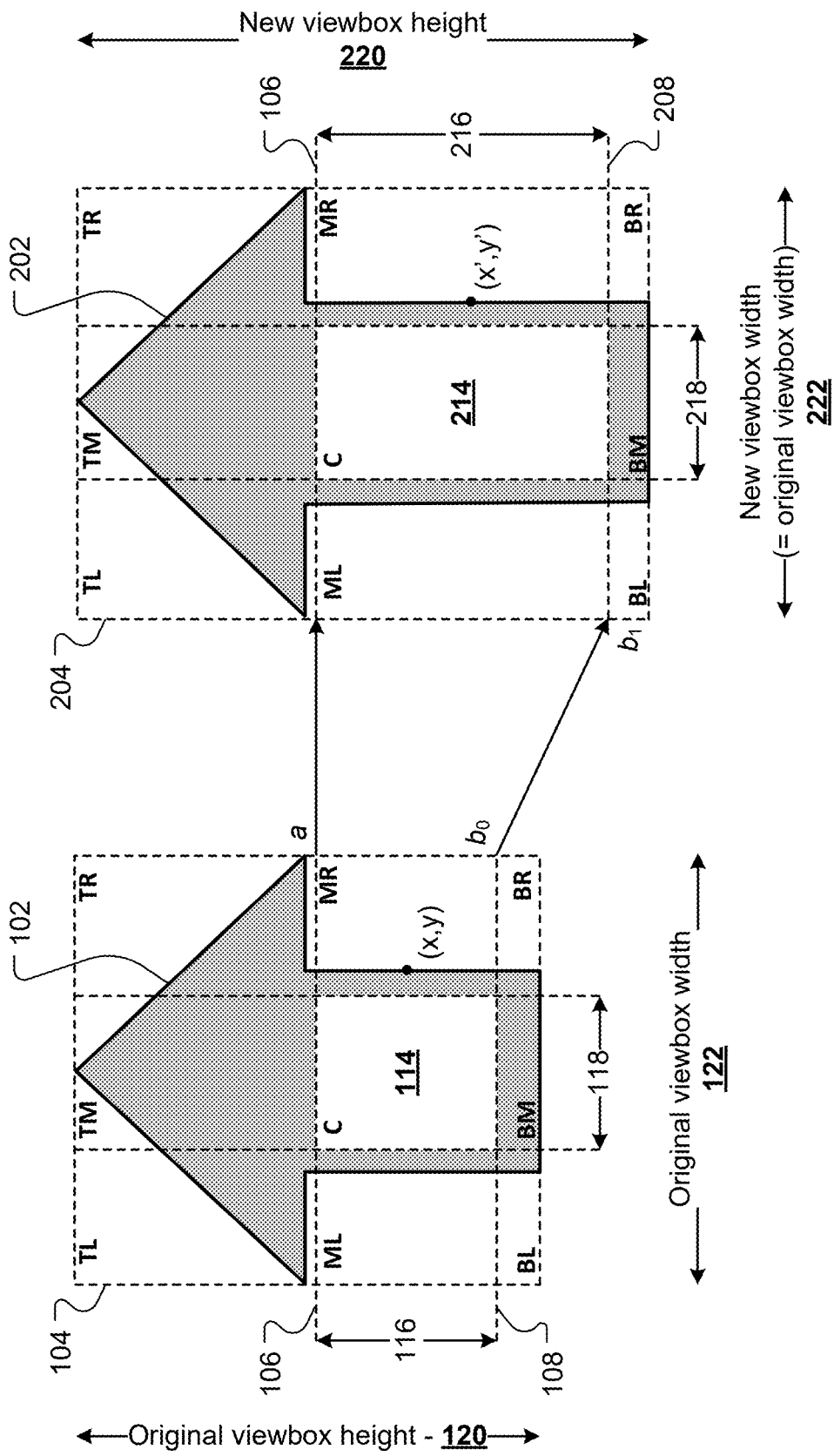
FIG. 2 depicts deformation of the example deformable shape of FIG. 1.

To illustrate deformation, FIG. 2 depicts the original deformable shape 102 of FIG. 1 alongside a second shape 202. Shape 202 is a version of shape 102 after shape 102 has been deformed by being stretched in the vertical direction. This deformation has resulted in the original viewbox 104 deforming to a new viewbox 204. In particular, the original viewbox height has increased to a new viewbox height (but, given this example deals with vertical deformation, the original viewbox width has not changed).

In order to map coordinates from the initial coordinate space (of the original shape 102) to the new coordinate space (of deformed shape 202), original shape coordinates are transformed independently in the horizontal and vertical axes. The transformation algorithms for each axis are analogous. In the example depicted in FIG. 2, the original shape 102 has only been vertically stretched (deformed) and, therefore, only height (v) coordinates from the shape's original path are transformed. Deformation is described in more detail below with reference to processing 1410 of FIG. 14.

When a deformable shape is stretched (or deformed) vertically, a target slice height 216 is calculated such that:

target slice height (216)−original slice height (116)=new view box height (220)−original view box height (120)

In order to map a given y coordinate (v) of the shape's path from the original/initial coordinate space to a corresponding coordinate (v') in the new coordinate space, the following function can be used:

$$\text{deform}(y, a, b_0, b_1) = \begin{cases} y & \text{if } y \leq a \\ \frac{b_1 - a}{b_0 - a}(y - a) + a & \text{if } a < y < b_0 \\ y + b_1 - b_0 & \text{if } y \geq b_0 \end{cases}$$

Where:
y is the vertical coordinate that is being transformed;
a is the vertical coordinate of the original upper slice boundary (e.g. 106);
$b_0$ is the vertical coordinate of the original lower slice boundary (e.g. 108); and
$b_1$ is the coordinate of the new lower slice boundary at the target height (e.g. upper slice boundary+target slice height as calculated above, 208).

Accordingly, if the deformable path with shape data of

<path d="M 100 0 L 200 100 L 150 100 L 150 200 L 50 200 L 50 100 L 0 100 Z"/>

Was stretched vertically, a target slice height would be calculated and used to transform each y coordinate of the original shape data:

<path d="
M 100 (deform (0, . . . ))
L 200 (deform (100, . . . ))
L 150 (deform (100, . . . ))
L 150 (deform (200, . . . ))
L 50 (deform (200, . . . ))
L 50 (deform (100, . . . ))
L 0 (deform (100, . . . ))
Z"/>

Where a deformable shape is stretched (or deformed) horizontally (which is not the case in the example depicted in FIG. 2), transformation of x coordinates is performed in a similar manner to the transformation of y coordinates described above. For horizontal deformation, a target width would be calculated such that:

Target slice width (218)−original slice width (118) =new viewbox width (222)−original viewbox width (122)

In order to map a given x coordinate (x) of the shape's path from the original/initial coordinate space to a corresponding coordinate (x') in the new coordinate space, the following function can be used:

$$\text{deform}(x, a, b_0, b_1) = \begin{cases} x & \text{if } x \leq a \\ \frac{b_1 - a}{b_0 - a}(x - a) + a & \text{if } a < x < b_0 \\ x + b_1 - b_0 & \text{if } x \geq b_0 \end{cases}$$

Where
x is the horizontal coordinate that is being transformed;
a is the horizontal coordinate of the original left slice boundary (e.g. the slice left coordinate);
$b_0$ is the horizontal coordinate of the original right slice boundary (e.g. slice left+slice width); and
$b_1$ is the horizontal coordinate of the new right slice boundary at the target width (e.g. left slice boundary+ target slice width as calculated above).

Accordingly, if the deformable path with shape data of

<path d="M 100 0 L 200 100 L 150 100 L 150 200 L 50 200 L 50 100 L 0 100 Z"/>

Was stretched vertically, a target slice height would be calculated and used to transform each y coordinate of the original shape data:

<path d="
M (deform (100, . . . )) 0
L (deform (200, . . . )) 100
L (deform (150, . . . )) 100
L (deform (150, . . . )) 200
L (deform (50, . . . )) 200
L (deform (50, . . . )) 100
L (deform (0, . . . )) 100
Z"/>

If a shape is resized such that both vertical and horizontal deformation occur, a target slice height would be calculated and used to transform y coordinates (as described above) and a target width would be calculated and used to transform x coordinates (as described above).

Deformable Text Shapes

In the context of the present disclosure, a deformable text shape is a deformable shape (for example as described above) that has textbox data associated with it. The textbox data is used if text is added to (or associated with) the deformable text shape.

In the present disclosure, therefore, a deformable text shape is defined by deformable text shape data. For a given deformable text shape, the deformable text shape data includes path data, viewbox data, slice data, and textbox data.

The path data, view box data, and slice data for a deformable text shape may be the same as for a 'deformable shape' (e.g. as described above).

The textbox data for a deformable text shape defines a text box. The textbox is conveniently defined in the same initial coordinate space as the path data and slice data (though could be defined in an alternative coordinate space provided additional data is provided to allow conversion between those coordinate spaces). The text box, in turn, defines an available text entry area (which may, as discussed below, be reduced by one or more padding values).

Figure 3:
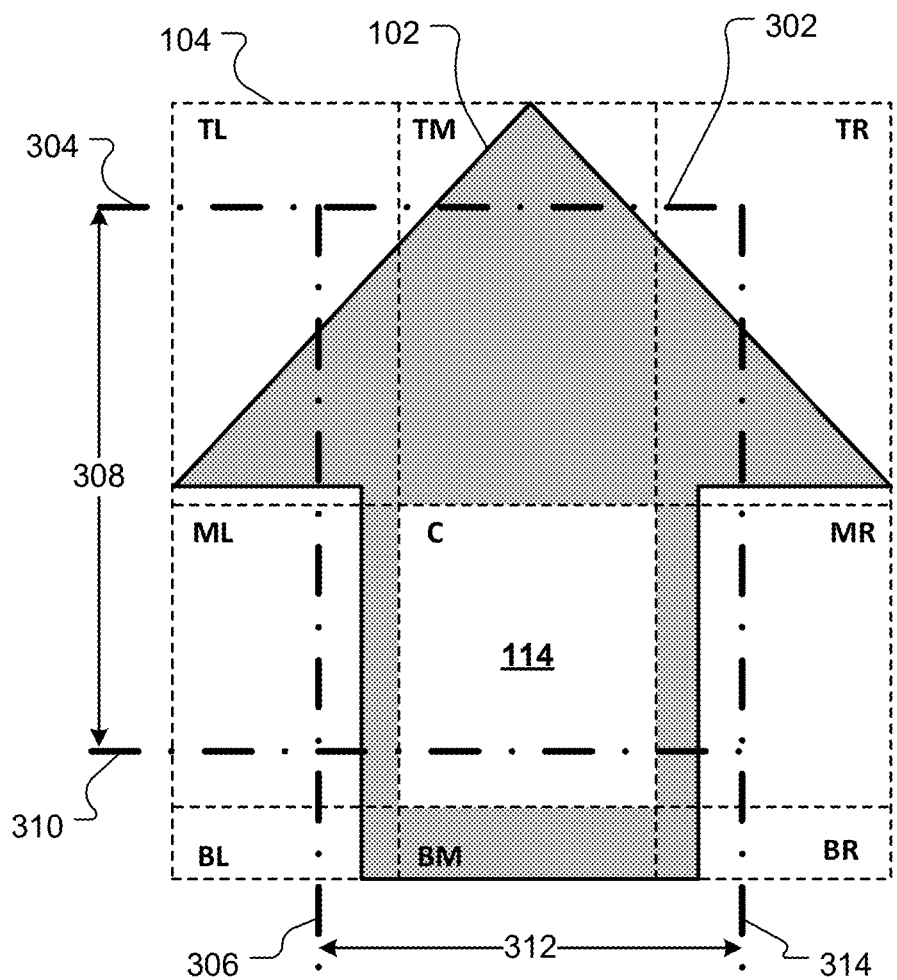
FIG. 3 depicts an example deformable text shape.

FIG. 3 depicts deformable shape 102 of FIG. 1 with a textbox 302 shown (textbox 302 depicted in bold dot-dash line). While the textbox boundaries are depicted in FIG. 3 (and other figures) for explanatory purposes, the textbox boundaries need not (and often will not) be displayed to a user.

The textbox data may define the textbox in various ways. For example, the textbox data may take a similar format to the slice data as described and define values for: a textbox top edge or min y coordinate 304 (e.g. the y coordinate of the textbox top edge), a textbox left edge or min x coordinate 306 (e.g. the x coordinate of the textbox left edge), a textbox height 308 (which, when added to the textbox top edge provides a y coordinate of the textbox bottom edge 310), and a textbox width 312 (which, when added to the textbox left edge, provides an x coordinate of the textbox right edge 314). As an alternative example, the textbox data may define two y coordinates (textbox top edge 304 and textbox bottom edge 310) and two x coordinates (textbox left edge 306 and textbox right edge 314).

In the present embodiments, the following textbox restrictions are imposed: the textbox top edge 304 cannot be in the bottom slice that is defined by the slice data (e.g. the BL, BM, or BR regions defined by the slice data); the textbox bottom edge 310 cannot not be in the top slice that is defined by the slice data (e.g. the TL, TM, or TR regions defined by the slice data); the textbox left edge 306 cannot not be in the right slice that is defined by the slice data (e.g. the TR, MR, or BR regions defined by the slice data); the textbox right edge 310 cannot not be in the left slice that is defined by the slice data (e.g. the TL, ML, or BL regions defined by the slice data).

As noted, the example initial coordinate space used in the described embodiments is a Cartesian plane with x coordinates increasing from left to right and y coordinates increasing from top to bottom. In this coordinate space, the above textbox restrictions may be expressed as the following set of requirements:

textbox top edge 304<lower slice boundary 108 (e.g. upper slice boundary 106+slice height 116);
textbox left edge 306<right slice boundary 112 (e.g. left slice boundary 110+slice width 118);
textbox bottom edge 310 (e.g. textbox top edge 304+textbox height 308)>top slice boundary 106; and
textbox right edge 314 (e.g. textbox left edge 306+textbox width 312)>left slice boundary 110.

In this case, a textbox will only be valid if all requirements are satisfied (and, conversely, will be invalid if any requirement is contravened).

In some instances, the textbox data for a deformable text shape may define a textbox that has edges that match the slice boundaries defined by the slice data (e.g. textbox left edge=left slice boundary, textbox right edge=right slice boundary, textbox height=slice height, textbox width=slice width).

As described in further detail below, the textbox data associated with a deformable text shape can be used to assist in various operations. For example, if text is added to a deformable text shape, the textbox data defines where the text is positioned relative to the shape. In some instances, the textbox data may be used to automatically resize a deformable text shape if the current size of the shape is not large enough to accommodate the text that is being added.

Figure 4:
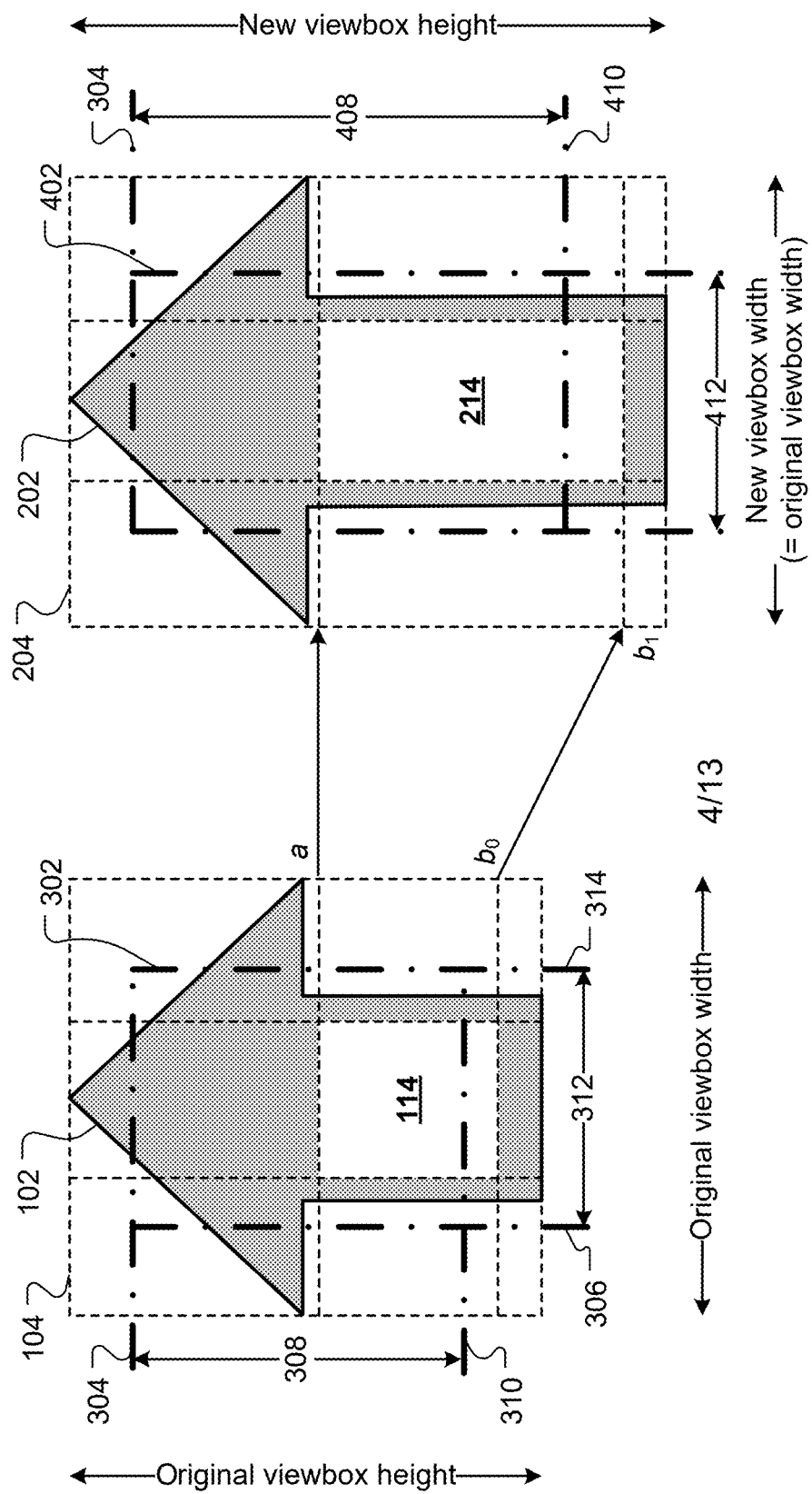
FIG. 4 depicts deformation of the example deformable shape of FIG. 3.

As another example, if a deformable text shape with associated text is resized, the textbox data may be used to determine how the associated text is adjusted to accommodate the resizing of the shape. FIG. 4 provides an example of this, in which the deformable text shape of FIG. 3 has been vertically stretched. FIG. 4 is similar to FIG. 2, excepting FIG. 4 also shows how the original textbox 302 of FIG. 3 has been transformed to new textbox 402.

Figure 5:
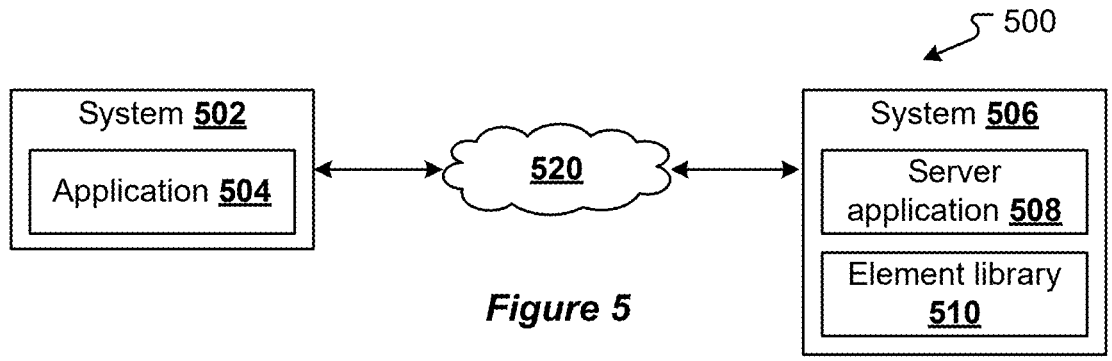
FIG. 5 depicts a computer processing system environment.

The techniques for creating and using deformable text shapes that are described herein are computer implemented techniques. With this in mind, FIG. 5 depicts a computer processing system environment 500.

Environment 500 includes a computer processing system 502 that is configured to perform the various functions described herein. Computer processing system 502 may be any suitable type of computer processing system, for example a desktop computer, a laptop computer, a tablet device, a smart phone device, or an alternative computer processing system.

In this example, computer system 502 is configured to perform various functions described herein by execution of a software application 504—that is, instructions that are stored in a storage device (such as non-transient memory 610 described below) that is accessible to the computer system 502 and that are executed by a processing unit of the system 502 (such as processing unit 602 described below).

Application 504 may take various forms, for example, application 504 be a native/stand-alone graphic design application that provides, for example, functions that allows a user to create, edit, save, print, publish, and/or share graphic designs. Alternatively, application 504 may be part of a larger graphic design (or other) application (e.g. an add-on or plug-in)—or may be configured to operate with a larger application—that is also executed on system 502.

Application 504 may be a native application or a web browser application (such as Chrome, Internet Explorer, Safari or an alternative web browser application).

By way of further alternative examples, while application 504 is depicted as running on a single computer processing system 502, it may be a distributed application in which the functionality is performed by multiple inter-operating applications that may execute on the same or different computer processing systems. As one example, application 504 may be a client application that communicates (via network 520) with one or more server applications (e.g. server application 508), and the functionality described herein is jointly performed by the client and server application(s).

Figure 9:
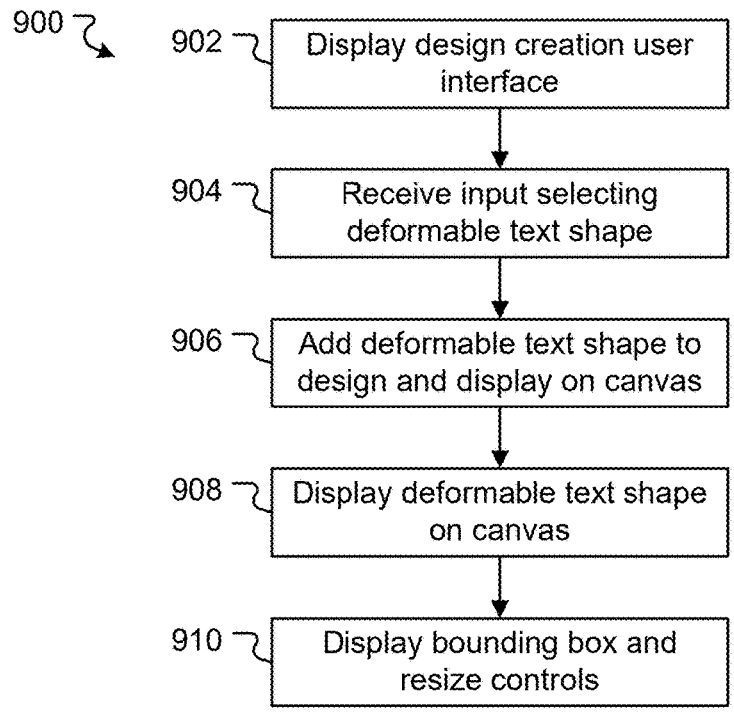
FIG. 9 depicts an example process for adding a deformable text shape to a design.
Figure 12:
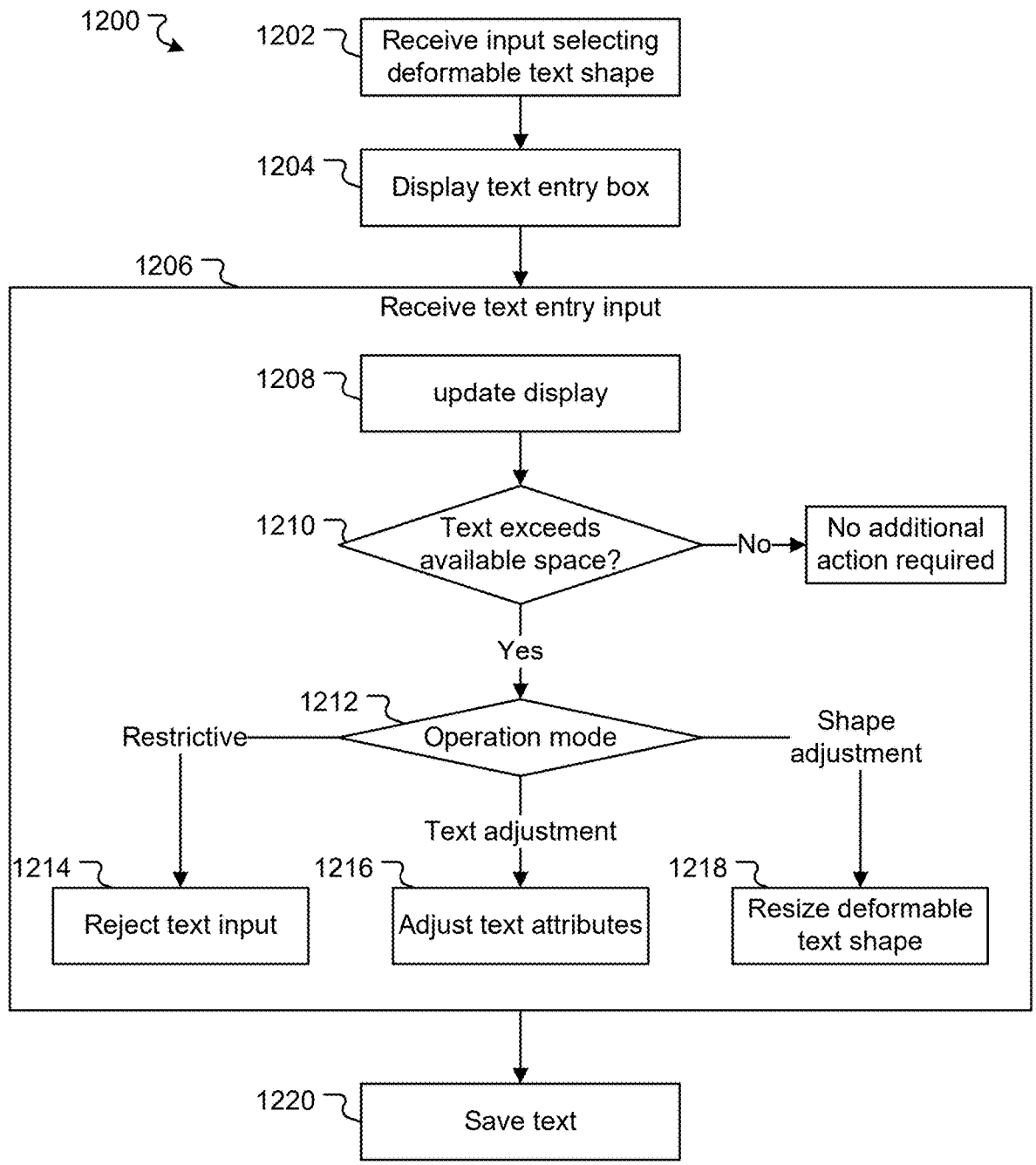
FIG. 12 depicts an example process for adding text to a deformable text shape.
Figure 14:
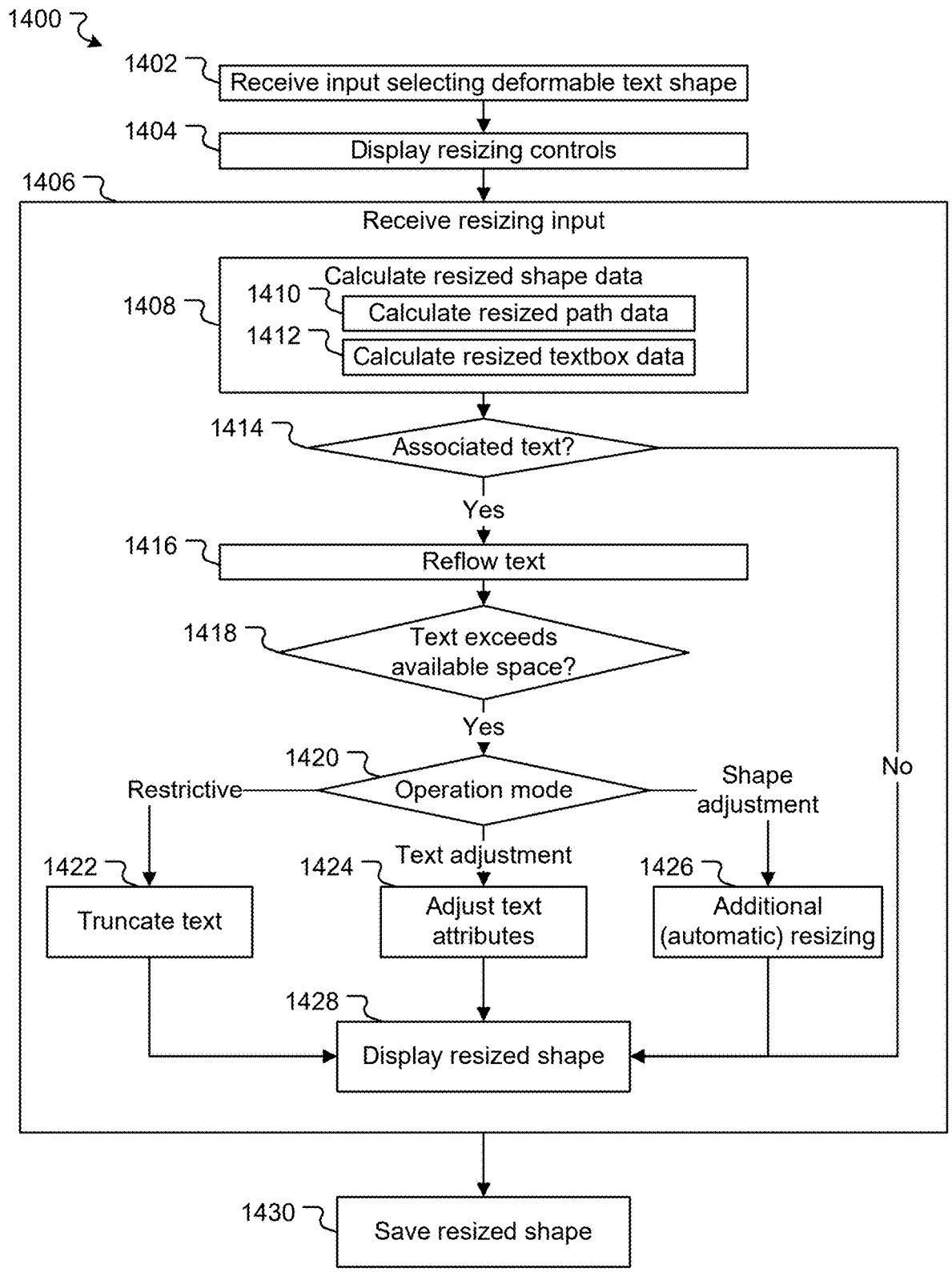
FIG. 14 depicts an example process for resizing a deformable text shape.

In the present disclosure, application 504 is described as configuring system 502 to provide functions that allow a user to create/define new deformable text shapes (see FIG. 7) and as configuring system 502 to provide functions that allow a user to use an existing deformable text shape when creating a design (see FIGS. 9, 12, and 14). In certain implementations, both of these functionalities may be provided to any user of application 504. In alternative implementations, while a single application such as application 504 may provide both shape creation and shape use functionalities, the shape creation functions may be restricted to users with appropriate permissions (e.g. a shape designer region). In alternative embodiments, however, different applications may be provided for shape creation and shape use. For example, a shape creation application may be provided for users that are to create new deformable text shapes, and a separate application may be provided for users that wish to create graphic designs using (inter alia) deformable text shapes that have been created by other users.

In the example of FIG. 5, system 502 is connected to a communications network 520. Via network 520 system 502 can communicate with (e.g. send data to and receive data from) other computer processing systems such as server system 506 (and, in particular with applications running on those systems such as server application 508).

The techniques described herein can, however, be implemented on a stand-alone computer system that does not require network connectivity or communication with other systems.

In FIG. 5, system 502 is depicted as having/executing a single application 504. However, system 502 may (and typically will) include additional applications (not shown). For example, and assuming application 504 is not part of an operating system application, system 502 will include separate operating system application (or group of applications).

FIG. 5 also depicts a server system 506, which is connected to network 520 and can communicate with other computer processing systems over the network 520. Server system 506 runs a server application 508. In client-server embodiments, the server application 508 executes to provide a client application endpoint that is accessible over communications network 520. To do so, the server application 508 may include one or more application programs, libraries, APIs or other software elements that implement the features and functions that are described herein. For example, where server application 508 serves web browser client applications the server application 508 will be a web server which receives and responds to, for example, HTTP requests. Where server application 508 serves native client applications, server application 508 will be an application server configured to receive, process, and respond to specifically defined API calls received from those client applications.

In the present example, the server application 508 maintains a library 510 of design elements. The library 510 may, for example, be a database application which the server application 508 uses to store, search for, and retrieve design elements (including deformable shape elements and deformable text shape elements as described further below).

Figure 6:
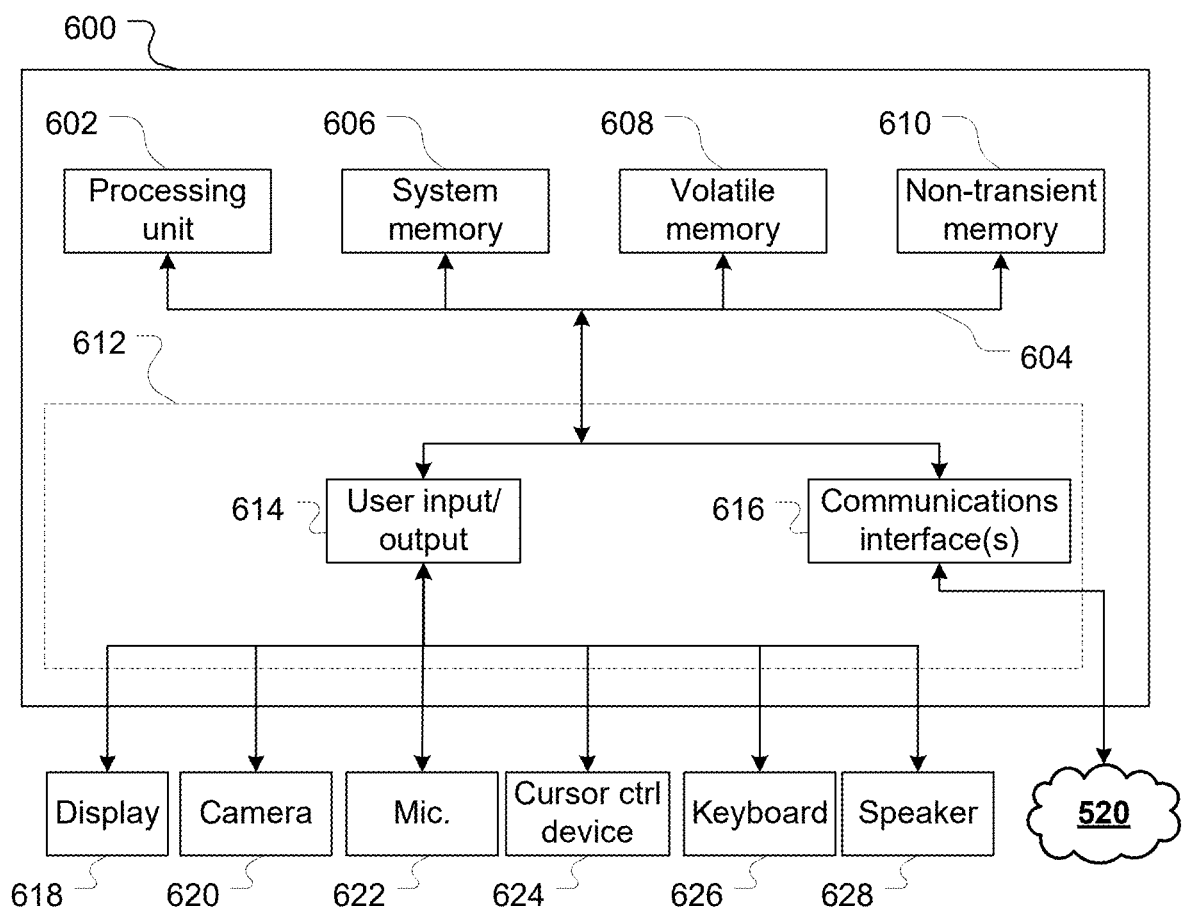
FIG. 6 is a block diagram depicting hardware components of a computer processing system.

Turning to FIG. 6, a block diagram depicting hardware components of a computer processing system 600 is provided. Computer processing systems 502 and/or 506 of FIG. 5 may each be (or include) a computer processing system such as 600 (though alternative hardware architectures are possible).

Computer processing system 600 includes at least one processing unit 602. The processing unit 602 may be a single computer processing device (e.g. a central processing unit, graphics processing unit, or other computational device), or may include a plurality of computer processing devices. In some instances, where a computer processing system 600 is described as performing an operation or function all processing required to perform that operation or function will be performed by processing unit 602. In other instances, processing required to perform that operation or function may also be performed by remote processing devices accessible to and useable (either in a shared or dedicated manner) by system 600.

Through a communications bus 604 the processing unit 602 is in data communication with a one or more machine readable storage devices (also referred to as memory devices). Computer readable instructions and/or data which are executed by the processing unit 602 to control operation of the processing system 600 are stored on one more such storage devices. In this example system 600 includes a system memory 606 (e.g. a BIOS), volatile memory 608 (e.g. random access memory such as one or more DRAM modules), and non-transient memory 610 (e.g. one or more hard disk or solid state drives).

System 600 also includes one or more interfaces, indicated generally by 612, via which system 600 interfaces with various devices and/or networks. Generally speaking, other devices may be integral with system 600, or may be separate. Where a device is separate from system 600, connection between the device and system 600 may be via wired or wireless hardware and communication protocols, and may be a direct or an indirect (e.g. networked) connection.

Wired connection with other devices/networks may be by any appropriate standard or proprietary hardware and connectivity protocols. For example, system 600 may be configured for wired connection with other devices/communications networks by one or more of: USB; eSATA; Ethernet; HDMI; and/or other wired connections.

Wireless connection with other devices/networks may similarly be by any appropriate standard or proprietary hardware and communications protocols. For example, system 600 may be configured for wireless connection with other devices/communications networks using one or more of: BlueTooth; WiFi; near field communications (NFC); Global System for Mobile Communications (GSM), and/or other wireless connections.

Generally speaking, and depending on the particular system in question, devices to which system 600 connects—whether by wired or wireless means—include one or more input devices to allow data to be input into/received by system 600 and one or more output device to allow data to be output by system 600. Example devices are described below, however it will be appreciated that not all computer processing systems will include all mentioned devices, and that additional and alternative devices to those mentioned may well be used.

For example, system 600 may include or connect to one or more input devices by which information/data is input into (received by) system 600. Such input devices may include keyboard, mouse (or other cursor control device), trackpad, microphone, accelerometer, proximity sensor, GPS, and/or other input devices. System 600 may also include or connect to one or more output devices controlled by system 600 to output information. Such output devices may include devices such as a display (e.g. a LCD, LED, touch screen, or other display device), speaker, vibration module, LEDs/other lights, and/or other output devices. System 600 may also include or connect to devices which may act as both input and output devices, for example memory devices (hard drives, solid state drives, disk drives, and/or other memory devices) which system 600 can read data from and/or write data to, and touch screen displays which can both display (output) data and receive touch signals (input).

By way of example, in the present disclosure computer processing system 502 will typically be a personal computing device or portable computing device. Where system 600 is a personal computing device such as a desktop or laptop device, it may include a display 618 (which may be a touch screen display), a camera device 620, a microphone device 622 (which may be integrated with the camera device), a cursor control device 624 (e.g. a mouse, trackpad, or other cursor control device), a keyboard 626, and a speaker device 628. s another example, where system 600 is a portable personal computing device such as a smart phone or tablet it may include a touchscreen display 618, a camera a camera device 620, a microphone device 622, and a speaker device 628.

In the present disclosure computer processing system 506 will typically be a server computing device. Where system 600 is a server computing device it may be remotely operable from another computing device via a communication network. Such a server may not itself need/require further peripherals such as a display, keyboard, cursor control device etc. (though may nonetheless be connectable to such devices via appropriate ports).

Alternative types of computer processing systems, with additional/alternative input and output devices, are possible.

System 600 also includes one or more communications interfaces 616 for communication with a network, such as network 520 of FIG. 5. Via the communications interface(s) 616, system 600 can communicate data to and receive data from networked systems and/or devices.

System 600 may be any suitable computer processing system, for example, a server computer system, a desktop computer, a laptop computer, a tablet computing device, a smart phone, a personal digital assistant, or an alternative computer processing system.

System 600 stores or has access to computer applications (also referred to as software or programs)—i.e. computer readable instructions and data which, when executed by the processing unit 602, configure system 600 to receive, process, and output data. Instructions and data can be stored on non-transient machine readable medium such as 610 accessible to system 600. Instructions and data may be transmitted to/received by system 600 via a data signal in a transmission channel enabled (for example) by a wired or wireless network connection over an interface such as communications interface 616.

Typically, one application accessible to system 600 will be an operating system application. In addition, system 600 will store or have access to applications which, when executed by the processing unit 602, configure system 600 to perform various computer-implemented processing operations described herein. For example, in FIG. 5 computer processing system 502 (which may be or include the hardware components of computer processing system 600) includes and executes application 504, and computer processing system 506 (which may be or include the hardware components of computer processing system 600) includes and executes application 508.

In some cases part or all of a given computer-implemented method will be performed by system 600 itself, while in other cases processing may be performed by other devices in data communication with system 600.

It will be appreciated that FIG. 6 does not illustrate all functional or physical components of a computer processing system. For example, no power supply or power supply interface has been depicted, however system 600 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Deformable Text Shape Creation

Figure 7:
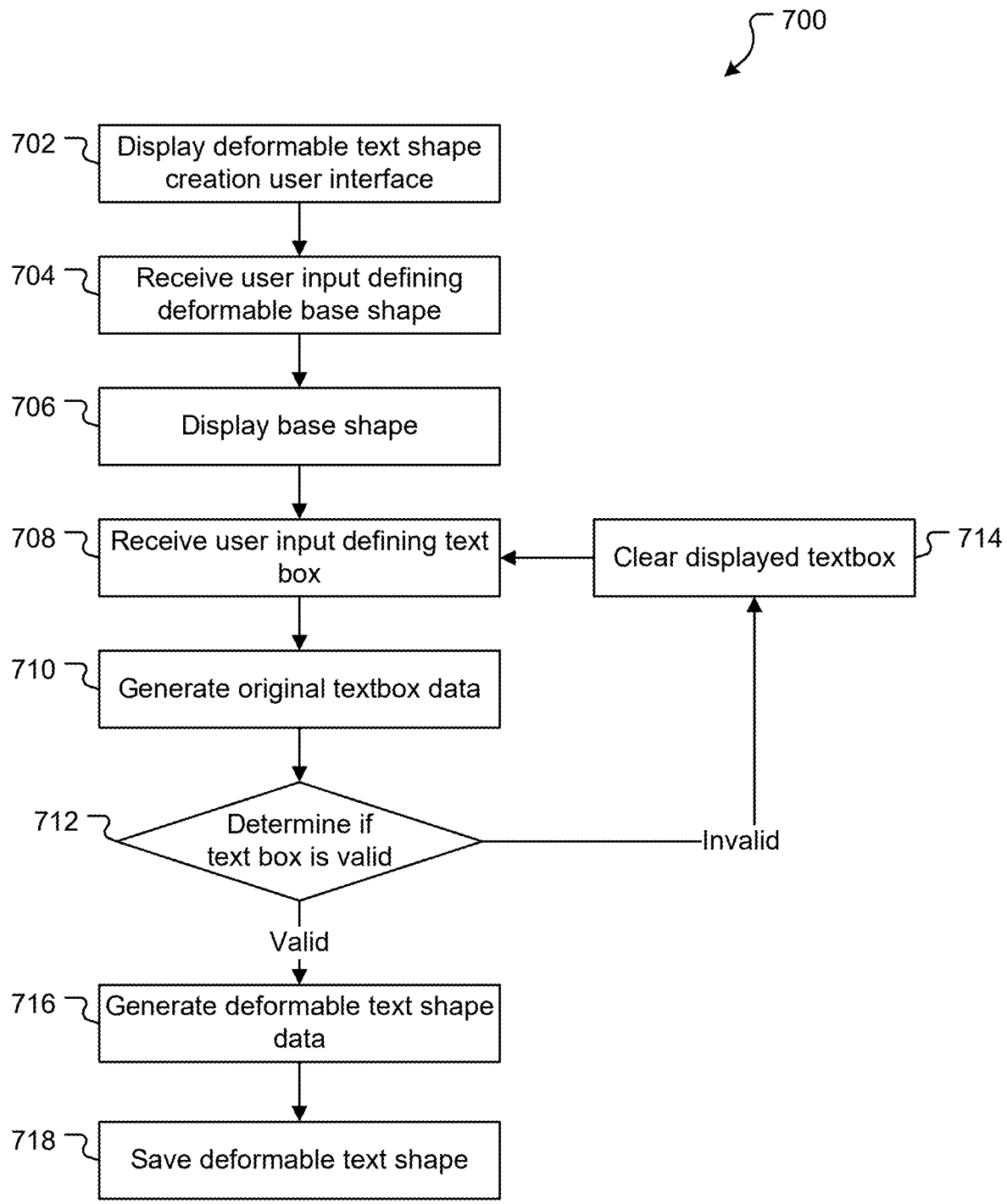
FIG. 7 depicts an example process for creating a deformable text shape.

Turning to FIG. 7, an example process 700 for creating a deformable text shape will be described. The operations of process 700 are described as being performed by application 504 (which is being executed by computer processing system 502).

At 702, application 504 displays a deformable text shape creation user interface (UI) (which may be referred to as shape creation UI for short) on a display (e.g. display 618).

Figure 8:
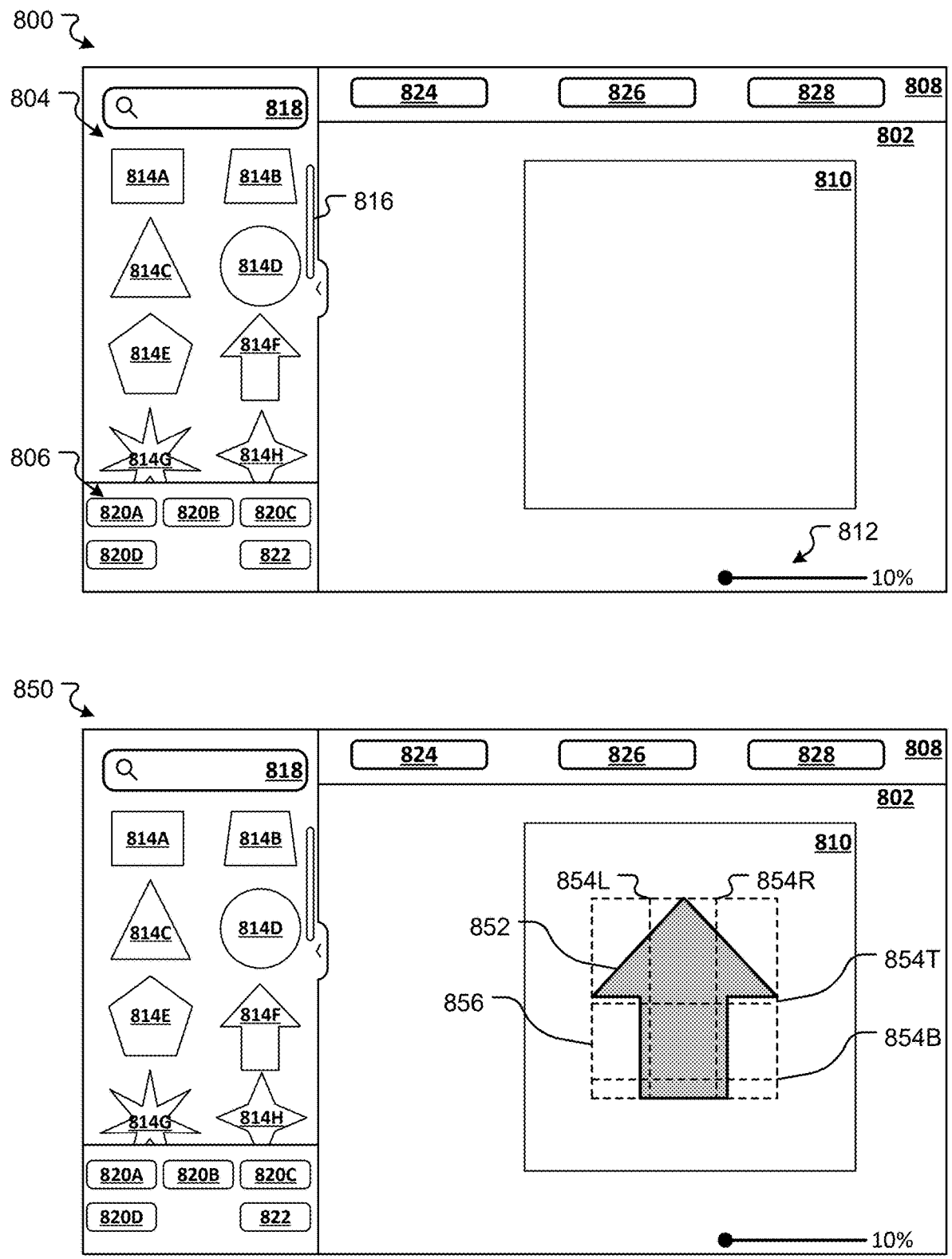
FIG. 8 depicts versions of a graphical user interface used to create a deformable text shape.
Figure 8:
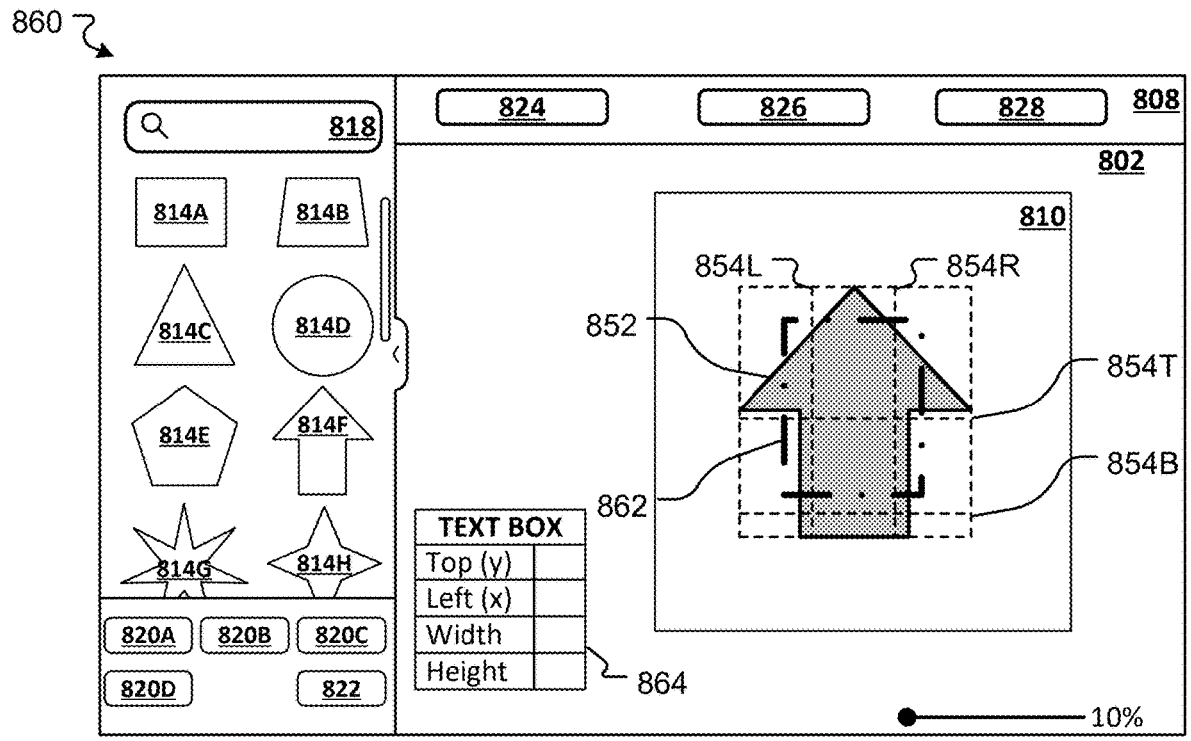

An example deformable text shape creation UI 800 is depicted in FIG. 8. In the present example, UI 800 includes a drawing region 802, a deformable shape selection region 804, a drawing tool region 806, and a control region 808.

Drawing region 802 includes a canvas 810 which is used to create a deformable text shape. A zoom control 812 is also provided allowing a user to increase/decrease the zoom level applied to the canvas 810.

In the present example, the deformable shape selection region 804 is used to display previews 814 of existing deformable shapes: that is, previews of existing shapes for which both path data and slice data has already been defined and which are accessible to application 504. Application 504 may be configured to access existing deformable shapes (and previews thereof) from locally accessible memory (e.g. non transient memory 610 of system 502). In addition, or alternatively, application 504 may be configured to access existing deformable shapes from one or more remote locations. For example, application 504 may communicate with server application 508 to request data in respect of deformable shapes and receive that data from the server application 508. (On receiving such a request, server application 508 may retrieve deformable shape data from element library 510). In this particular example, 8 existing deformable shape previews 814A to 814H are shown (with a scroll control 816 indicating that further previews are available for display). In addition, a search control 818 is provided to allow a user to search for existing deformable shapes that are available (e.g. by entering a textual description of a desired shape).

In the present example, the drawing tool region 806 is used to display drawing tools 820 that can be used to draw an original deformable shape. Application 504 may provide any appropriate drawing tools, such as a selection control 820A, a straight line control 820B, an arc control 820C, a free-form curve control 820D, and/or alternative drawing controls. In this example, the drawing tool region also includes a define slice box control 822 which, as described below, can be used to define a slice box for a newly drawn deformable shape.

In certain implementations, application 504 may be configured to only display one or the other of the shape selection region 804 and drawing control region 806.

In the present example, the control region 808 is used to display additional controls that may be used in creating a deformable text shape. In the present example, these controls include a define textbox control 824, a discard shape control 826, and a save deformable text shape control 828.

At 704, application 504 receives user input defining a base shape that is to be used to create the deformable text shape. This may be referred to as a first user input (first used as a distinguishing descriptor rather than in an ordinal sense). The base shape is a deformable shape as described above, and includes both path data and slice data.

In the present example, and referring to example UI 800, various user inputs defining the base shape are possible.

For example, user input defining the base shape may be user input that selects an existing deformable shape as the base shape. This may, for example, be user input that selects an existing deformable shape preview 814—e.g. by clicking (e.g. via a cursor control device 624) or contacting (e.g. via a touch screen display 618) on a preview 814, by dragging a selected preview 814 from the shape selection region 804 to the canvas 810, or by other user input selecting an existing deformable shape.

As an alternative example, user input defining the base shape may include a user input that draws a shape (referred to as path definition input, and which application 504 uses to generate path data) and user input that defines a slice box for the newly drawn shape (referred to as slice definition input, and which application 504 uses to generate slice data). User input defining the base shape may also include user input that defines a viewbox for the base shape (e.g. user input that defines a rectangle that becomes the view box). Alternatively, however, the view box for the base shape may be automatically calculated (e.g. as a bounding box around the shape as defined by the path data). For example, and referring to example UI 800, a user may draw a new shape on canvas 810 by using one or more drawing tools 820. Once the shape is drawn, the user may then select the define slice box control 822 to draw a slice box onto the new shape (the four edges of the slice box used to determine the slice data for the new deformable shape).

At 706, and in response to the user input defining the base shape, application 504 displays the base shape, for example on canvas 810. In the present example, application 504 displays the path of the base shape that has been defined (based on the base shape's path data) and slice indicators (based on the base shape's slice data). In the present embodiment, displaying the base shape further includes displaying the viewbox (e.g. the boundaries thereof) of the base shape (based on the view box data). This provides a visual reference to that may assist a user when defining a textbox for the base shape as described further below.

In FIG. 8, UI 850 is a version of UI 800 following user input selecting a base shape. In this particular example, the base shape corresponding to preview 814F has been selected and is displayed on the canvas 810. As can be seen, in this example application 504 displays: the path of the base shape 852 (an arrow, defined by the selected base shape's path data, grey-filled in this example for ease of identification); slice indicators 854 (in this case broken lines indicating the upper slice boundary (854T), the lower slice boundary (854B), the left slice boundary (854L), and the right slice boundary (854R)); and the base shape's view box 856 (in this case the broken-line rectangle encompassing the base shape).

At 708, application receives user input that defines a textbox for the deformable text shape being created. This may be referred to as a second user input (second used as a distinguishing descriptor rather than in an ordinal sense).

In the present example, the user input defining the textbox may include a user input that selects the define textbox control 824. In response to this user input, application 504 provides the user with a rectangular selection tool. The user can then use the rectangular selection tool to define a rectangular region on top of the base shape that is displayed on the canvas 810. Various ways of defining a rectangular region are possible. In the present embodiments, a user defines a rectangular region by input that selects two points on the canvas, those two points defining opposite corners of the rectangular region. As one example, a user may select a first point by clicking and holding a button of a cursor control device 624 at a first position on canvas 810, then select the second point by dragging the cursor and then releasing the button at a second position on the canvas.

In the present example, application 504 displays the textbox being defined by the user as the user is defining it. The textbox is displayed on the canvas 802 in a way that is visually distinct from the shape path 852 and the slice indicators 854.

In FIG. 8, UI 860 is a version of GUI 800 following user input defining the textbox. In this particular example, the textbox 862 defined by the user is distinguished from the shape path 852 (displayed in unbroken line) and slice indicators 854 (depicted in broken lines) by use of a different line format (here, the textbox 862 displayed in heavier weight dot-dash lines). Alternative mechanisms for visually distinguishing the textbox 862 from the shape path 852 and slice indicators 854 are possible, for example by use of different line colours, different line formats, different fill patterns, different fill colours, and/or other mechanisms.

In example UI 860 of FIG. 8 application 504 additionally displays a textbox parameter interface 864. The textbox parameter interface 864 displays parameters of the textbox being defined by the user, in this example the textbox top edge coordinate, the textbox left edge coordinate 306, the textbox height 308, and the textbox width. In this example, the textbox parameter interface 864 may also be used to define the textbox by directly entering desired top/left/width/height values.

In certain implementations, application 504 may be configured to generate and display a default textbox once the base shape has been defined. For example, application 504 may generate and display a default textbox that has: the same coordinates/dimensions as the view box of the base shape; the same coordinates/dimensions as the slicebox of the base shape; or alternative coordinates/dimensions. Where a default textbox is generated and displayed, a user may interact with the default textbox (e.g. by dragging its edges and/or corners, or by entering values in a textbox parameter interface such as 864) to change its shape and dimensions. In other implementations application 504 is not configured to generate/display a default textbox.

At 710, once the user input defining the textbox has been completed, application 504 generates textbox data based on the user input defining the textbox. In the present example, the textbox data includes: a textbox top edge coordinate (e.g. the y coordinate of the top edge of the rectangular region defined by the user), a textbox left edge coordinate 306 (e.g. the x coordinate of the left edge of the rectangular region defined by the user), a textbox height 308 (e.g. the y coordinate of the bottom edge of the rectangular region defined by the user minus the textbox top edge coordinate), and a textbox width (e.g. the x coordinate of the right edge of the rectangular region defined by the user minus the textbox left edge coordinate).

At 712, application 504 determines if the textbox defined by the user is valid. As noted above, in the present embodiments application 504 imposes restrictions on the textbox that a user can define for a new deformable text shape. These restrictions may be implemented in various ways. For example, application 504 may be configured to test the textbox data for the textbox defined by the user against the requirements as described above. In the initial coordinate space used in the present embodiments, this may involve, for example, application 504 testing the following requirements:

coordinate of textbox top edge<coordinate of lower slice boundary 854B;
coordinate of textbox left edge<coordinate of right slice boundary 854R;
coordinate of textbox bottom edge>coordinate of top slice boundary 804T; and
coordinate of textbox right edge>coordinate of left slice boundary 804L.

If, at 712, application 504 determines that the textbox is not valid (e.g. one or more of the above requirements is contravened), processing proceeds to 714. In this case, and in the present example, application 504 ceases displaying the textbox defined by the user. In this case application 504 may also display an error message to the user indicating that the textbox was invalid (and may also display an indication of why the textbox was invalid and/or the requirements for the textbox to be valid). Processing then returns to 708 to await further input defining a new textbox.

If, at 712, application 504 determines that the textbox is valid (e.g. all of the above requirements are satisfied), processing proceeds to 716. At 716, application 504 generates deformable text shape data before saving the deformable text shape data at 718.

At 716, application 504 generates deformable text shape data for the new deformable text shape. This may be performed, for example, in response to user input selecting the save deformable text shape control 828.

In order to generate the deformable text shape data, application 504 creates a new dataset in which the textbox data (generated at 710) is associated with the shape data of the base shape defined at 704 (e.g. the base shape path data and the base shape slice data). Various data formats for the new shape may be adopted. As one example, the new deformable text shape may be defined by an object (e.g. a dictionary or key/value pair) with the following attributes:

| Attribute key | Attribute value | Example |
| --- | --- | --- |
| Id | A unique identifier for the deformable text shape | "ShapeID": "abcd1234"; |
| Path | The path data for the deformable text shape-e.g. a string of SVG commands or alternatively data defining a path. | "Path": " . . . " |
| Viewbox | The viewbox data for the deformable text shape. | "Viewbox": [x, y, width, height]; |
| Slice | The slice data for the deformable text shape (defining, for example, the slice top boundary, left boundary, width, and height) | "Slice": [top, left, width, height]; |
| Textbox | The textbox data for the deformable text shape (defining, for example, the textbox top edge, left edge, width, and height) | "Textbox": [top, left, width, height]; |
| Keywords | An optional string with descriptors of the deformable text shape that may be used to search for the shape (e.g. "star", rectangle", "arrow", . . . ). Application 504 may provide-via UI 800 or an alternative means-controls for the creator of a new deformable text shape or other authorised user to associate such keywords with the shape. | "Keywords": "arrow" |

At 718, application 504 then completes creation of the new deformable text shape by saving the deformable text shape data generated at 716. Application 504 may be configured to save the new deformable text shape in various ways and in various locations.

For example, application 504 may save the deformable text shape to a locally accessible design element library that is maintained on locally accessible memory (e.g. non transient memory 610 and/or other memory accessible to system 520).

Alternatively, or in addition, application 504 may cause the deformable text shape to be saved at a remote location (which may then make the shape accessible to other users). For example, application 504 may communicate the deformable text shape data to server application 506 which, on receiving the shape data, may save the deformable text shape data to element library 510.

Alternatively, or in addition, application 504 may provide mechanisms by which a user can share the deformable text shape with other users (e.g., by email, instant message, or other communication means) and/or publish the deformable text shape (e.g. by uploading to a website or other digital publication platform).

Deformable Text Shape Use: Adding a Deformable Text Shape to a Design

Examples of how a deformable text shape may be used when creating a graphic design will now be described.

Initially, and with reference to FIG. 9, an example process 900 of how a deformable text shape may be added to a design that is being created will be described. The operations of process 900 are described as being performed by application 504 (which is being executed by computer processing system 502).

At 902, application 504 displays a design creation user interface.

Figure 10:
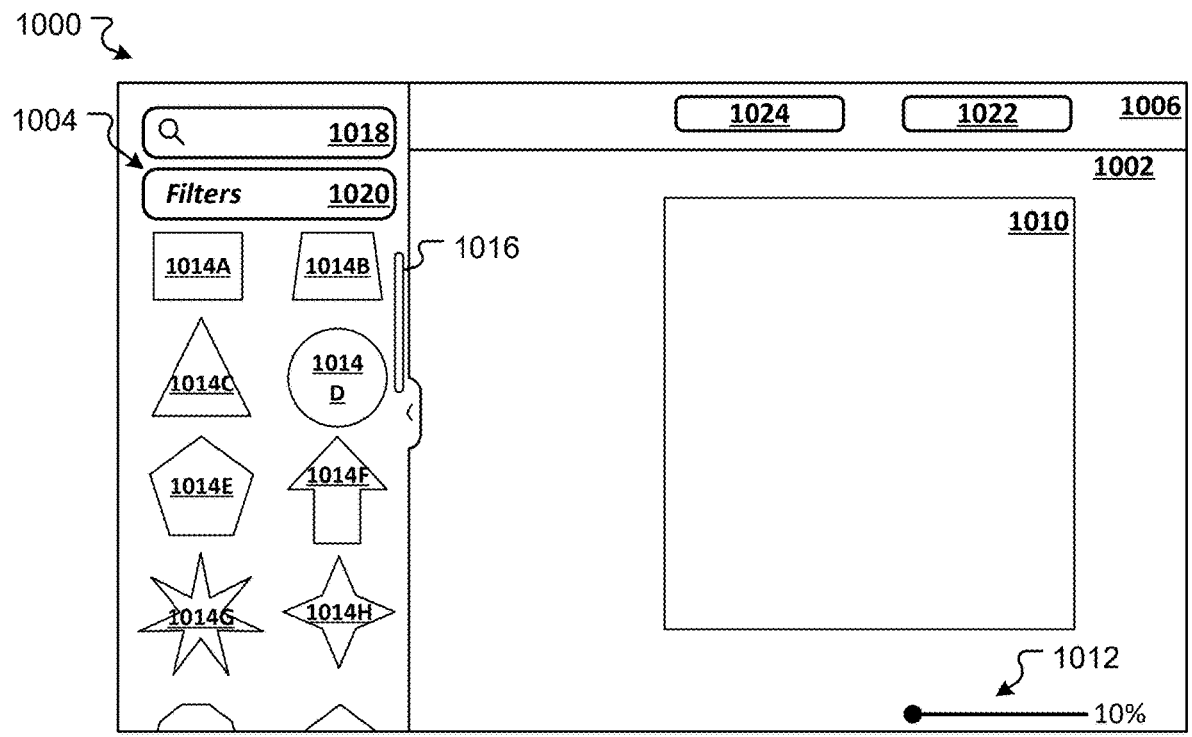
FIG. 10 depicts an example design creation user interface.

An example design creation UI 1000 is depicted in FIG. 10. In the present example, UI 1000 includes a drawing region 1002, a design element selection region 1004, and a control region 1006.

Drawing region 1002 includes a canvas 1010 which is used to create a graphic design. A zoom control 1012 is also provided allowing a user to increase/decrease the zoom level applied to the canvas 1010.

In the present example, the design element selection region 1004 is used to display previews 1014 of design elements that a user may wish to add to the design they are creating.

Design element selection region 1004 also includes a search control 1018, which can be used to search for particular design elements via keywords. For example, a user may enter the keyword "arrow" if they are searching for design elements that somehow relate to arrows.

Design element selection region 1004 also includes a filter control 1020, which can be used to apply filters to any search that is performed. For example, a user may apply a "deformable text shape" filter which causes only previews of deformable text shapes to be displayed in the design element selection region 1004.

Application 504 may be configured to access existing design elements (and previews thereof) from locally accessible memory (e.g. non transient memory 610 of system 502). In addition, or alternatively, application 504 may be configured to access existing design elements from one or more remote locations. For example, application 504 may communicate a request to the server application 508 to request data in respect of design elements and, in response, receive design element data from the server application 508. (On receiving such a request, server application 508 may retrieve data in respect of design elements data from element library 510).

Previews 1014 of various different types of elements may be displayed in the design element selection region 1004. In this particular example, the design element previews 1014 are previews of deformable text shapes that have been created for users to use when creating designs. These may, for example, be displayed in response to a user applying a "deformable text shape" filter without any specific search string. This causes application 504 to retrieve all (or some) deformable text shapes that are available (locally and/or at a remote server) and display previews of those deformable text shapes. Such deformable text shapes may, for example, be created as described above. In FIG. 10, eight existing deformable shape previews 1014A to 1014H are completely shown (with two partially shown shapes and a scroll control 1016 indicating that further previews are available for display).

In the present example, the control region 1006 is used to display additional controls that may be used in creating, saving, sharing, publishing, or otherwise working with the graphical design that is being created. Furthermore, application 504 may be configured to display different controls in region 1006 depending on context. For example, when a user has selected a deformable text shape controls allowing a user to adjust various properties of the shape may be displayed in region 1006—e.g. controls to adjust fill colour, fill pattern, fill opacity, line colour, line weight, line pattern, line opacity, and or other properties. As a further example, when a user is adding text to a shape, various text-related controls may be displayed in control region 1006—e.g. controls to adjust text colour, font style. font type, font size, line spacing. and/or other text properties. In this particular example, controls in region 1006 include a save design control 1022 (activated by a user to save the design being created) and a share/publish design control 1024 (activated by a user to share or publish the design being created). Additional or fewer controls may be displayed, as may alternative controls.

At 904, application 504 receives user input selecting a deformable text shape that is to be added to the design being created. This may be referred to as a shape selection user input. Various shape selection user inputs are possible.

By way of example, and referring to example UI 1000, the shape selection user input may be user input that selects a deformable text shape preview 1014. This may involve simply selecting the preview 1014 (e.g. by clicking on or contacting the preview 1014) in which case application 504 may add the deformable text shape corresponding to the selected preview 1014 to the canvas 1010 at a default position (e.g. a centre of the canvas 1010). Alternatively, the shape selection user input may involve selecting a preview 1014, dragging that preview to a particular position on the canvas 1010, and releasing the preview 1014 at that particular position (in which case application 504 adds the deformable text shape corresponding to the selected preview to the design at the particular position).

Application 504 may provide alternative mechanisms for selecting a deformable text shape and adding it to the design being created. For example, application 504 may provide various menus or other controls for selecting and adding elements, may enable a user to drag a deformable text shape from another application and drop it onto the canvas 1010, and/or may allow a user to copy a deformable text shape from another application or file location and paste the copied shape onto the canvas 1010 (e.g. via a clipboard type functionality).

At 906, application 504 adds the selected deformable text shape to the design that is being created. Typically this will involve updating design data in respect of the design to record that a new design element (in this case a deformable text shape) has been added to the design page. If design data is locally stored (e.g. on non-transient memory such as 610), application 504 may directly update the locally stored data. If design data is remotely stored (e.g. by a server application such as 508), application 504 may communicate relevant data to the server application 508 so it can update the design data.

Various design data formats (which store various information) are possible. As one example, design data for a given design may include a page record for each page of the design (a given page corresponding to a particular canvas 1010). The page record may include data such as page dimensions (e.g. a page width and page height) and element data (defining design elements that have been added to the page). The element data for a given page may. for example, be an array of element records, each element record defining an element that has been added to the design page. In this case, updating design data to record that a new deformable text shape has been added to the design includes adding an element record with data in respect of the deformable text shape to the element data. The element record for the newly added deformable text shape may include data defining the deformable text shape itself (e.g. the path data, slice data, and textbox data), or may provide a pointer or reference to such data. The element record may also include additional information such as an element origin (e.g. an (x,y) coordinate pair defining the position of the element on the canvas 1010/design page) and an element size (e.g. width and height which define the element's width and height and which are initially default values—e.g. as defined by the original deformable text shape's data).

By way of more specific example, an element record for an element that has been added to a design page may take the form of an object (e.g. a map or a dictionary) which defines attributes such as the following:

| Key/attribute | Note | E.g. |
| --- | --- | --- |
| Type | A value defining the type of the element (E.g. image, shape, video, audio, other). | "type": "SHAPE", |
| Position | Data defining the position of the element on the page/canvas: e.g. an (x, y) coordinate pair defining (for example) the top left point of the element. | "position": (100, 100), |
| Size | Data defining the size of the element: e.g. a (width, height) pair. | "size": (500, 400), |
| Rotation | Data defining any rotation of the element. | "rotation": 0, |
| Opacity | Data defining any opacity of the element. | "opacity": 1, |
| Data | Data defining (or providing a link or pointer to) the original element data. In the case of a deformable text shape, this attribute may be used to store the original deformable text shape's path data, slice data, and textbox data (or a link or pointer to such data). | "data": { . . . }, |
| Text | Data defining any text that has been added to (or associated with) the element. This may include data as | "text": { . . . } |

| Key/attribute | Note | E.g. |
|---|---|---|
| | to the text characters themselves along with formatting data (e.g. font size, type, style, colour, line spacing, character spacing, and/or other formatting data). | |

Alternative element record formats and/or alternative attributes are possible.

At 908, application 504 displays the deformable text shape that has been added to the design on the canvas 1010. Application 504 displays the deformable text shape at a default size (which may be the original size as defined by the deformable text shape's path data) and at the location at which the deformable text shape has been added (which, as described above, may be a default location or a location specified by the user).

In the present example, at 910, application 504 displays a bounding box and resize controls for the newly added deformable text shape. In this example, application 504 displays the bounding box and resize controls for a design element in response to the element being selected, and application 504 is configured to automatically select any element that has just been added to the design. In other embodiments, an element that is added to a design need not be automatically selected (and/or bounding box and resize controls need not be displayed when an element is added to the design).

Figure 11:
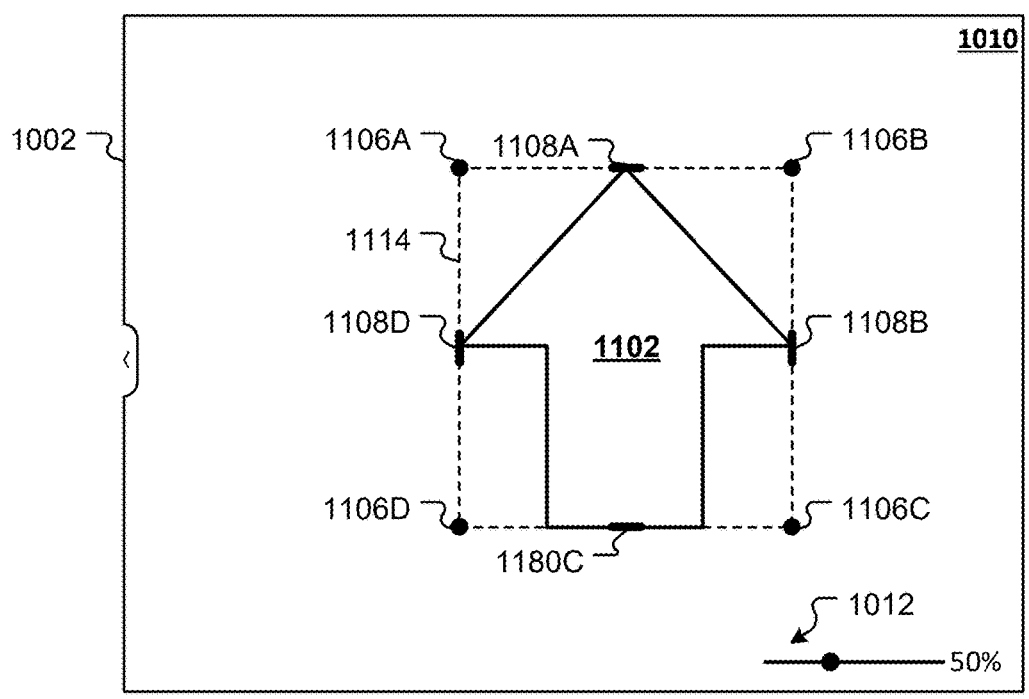
FIG. 11 depicts an example user interface showing a design to which a deformable text element has been added.

FIG. 11 depicts the design region 1002 of UI 1000 following selection of a deformable text shape. In this example, the canvas 1010 has been enlarged and occupies the entirety of the design region 1002 (so the edges of the canvas are no longer visible). In this example, preview 1014F of FIG. 10 has been selected and, accordingly, the deformable text shape 1102 corresponding to that preview is displayed on canvas 1010. In this example, application 504 also displays a bounding box 1104 for the deformable text shape 1102 along with a plurality of resizing controls that include scale controls 1106 and stretch controls 1108 (described further below).

Deformable Text Shape Use: Adding Text to a Deformable Text Shape

Once a deformable text shape has been added to a design, a user may add text to the shape. An example process 1200 for adding text to a deformable text shape will be described. In this section, reference to a shape is to be taken as reference to a deformable text shape.

At 1202, and if the shape is not already selected, application 504 receives user input selecting a deformable text shape. This may, for example, be user input clicking on or contacting the shape 1102 on the canvas 1010.

As described above, on detecting selection of shape 1102 application 504 may display a bounding box 1114 and resize controls 1106/1108.

Figure 13:
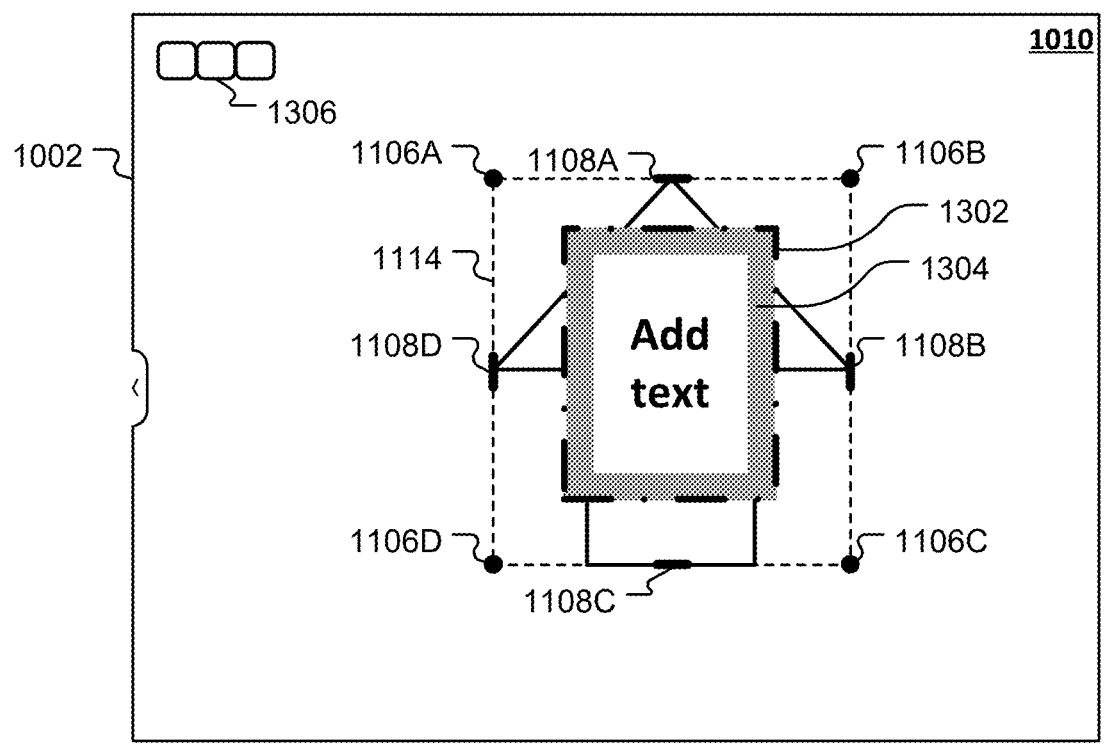
FIG. 13 depicts an example user interface for adding text to a deformable text shape.

In the present embodiment, at 1204, application 504 displays a text entry box for the shape 1102. An example text entry box 1302 is depicted in FIG. 13 (which depicts the design region 1002 of UI 1000). In this example, the text entry box boundaries 1302 and padding 1304 are displayed atop the selected shape, along with a prompt indicating that text can be added (the prompt in this example reading "Add text").

In alternative embodiments text entry box boundaries (and padding if defined) are not actually displayed. In further alternative embodiments, the text entry box boundaries (and/or padding) may be selectively displayed, for example by providing a display text box boundaries control which a user can activate to show the text box boundaries and/or padding or deactivate to hide the textbox boundaries and/or padding.

Application 504 determines the coordinates of the text entry box 1302 (which define its position and size) based on the shape's textbox data. If the shape is displayed at its original proportions, the text entry box 1302 is displayed at its originally defined proportions (though translation from the initial coordinate space in which the textbox data is defined to the design coordinate space—and particular position in the design coordinate space) may be required).

If the shape has been resized and is no longer its original proportions, resized textbox data is calculated and the text entry box 1302 is displayed in accordance with the resized textbox data. This is discussed further below with reference to FIG. 14.

In embodiments where the text entry box boundaries and/or padding are displayed, application 504 may automatically do so when a deformable text shape is selected. Alternatively, application 504 may be configured to display text entry box 1302 in response to a further user input. Such an input may, for example, be one or more of: a user hovering a cursor over the deformable text shape 1102; a user double clicking on deformable text shape 1102; a user selecting an 'add text' control (which application 504 may, for example, display in the control region 1006); a user inputting text characters (e.g. by a keyboard) while the deformable text shape is displayed; and/or other user inputs.

At 1206, application 504 receives input defining text that is to be added to (or associated with) the deformable text shape 1102. This may be referred to as text entry input. The text entry input will define one or more text characters.

In addition to defining actual text characters, application 504 may provide controls (e.g. in control region 1006 or alternatively) for a user to define one or more text attributes. Such attributes may, for example, include: font type; font style; font size; font colour; character spacing; line spacing; horizontal position (left/right/justified); vertical position (top, bottom, centre); text direction (e.g. horizontal left-to-right, horizontal right-to-left, vertical top-to-bottom, vertical bottom-to-top) and/or other text attributes. Input defining text attributes may be provided as part of the text entry input or as a separate input.

In addition to defining actual text characters, application 504 may provide controls (e.g. in control region 1006 or alternatively) for a user to define text padding. The text padding defines a padding region within the text entry box 1302 that application 504 will not render text in. Text padding may, for example, be defined by a single value (in which case that value is applied equally on all sides of the text entry box 1302). Alternatively, text padding may be defined by four separate values that respectively define the width of a top, a left, a right, and a bottom padding region within the text entry box 1302. Application 504 may be configured to define default padding for a text entry box—e.g. a default number of pixels to be applied on all sides (e.g. 4 pixels, though alternative values may be selected). In addition, or alternatively, application 504 may be configured to impose a maximum padding width value. For example, application 504 may impose a maximum padding width that is half the smallest text entry box dimension minus 2.5 px (ensuring that at least 5 px is available for text). Where padding is defined, reference to the available area provided by a text entry box is reference to the area of the text entry box less the defined padding. Where padding is defined (either by default or by a user), application 504 may be configured to visually indicate the padding on the display. An example of this is depicted in FIG. 13, where padding 1304 is depicted by grey shading. In this example, therefore, the available area of text entry box 1302 is the area inside the grey-shaded padding. Input defining padding may be provided as part of the text entry input or as a separate input.

In the present embodiments, while text entry input is received application 504 performs various operations.

At 1208, application 504 updates the display in accordance with the input. Generally speaking. this involves rendering the characters received in the text entry input inside the text entry box 1302 (in accordance with text attributes that have been defined (by a user or by default) and/or any padding that has been defined (by a user or by default)).

At 1210, while text is being entered, application 504 determines whether the text being entered exceeds the available area provided by the text entry box 1304 at its current size. To do so, application calculates the size that would be occupied by the entered text (based on the text attributes such as font type, font size, character spacing, line spacing, font style, and/or any other relevant attributes) and compares this to the available area provided by the text entry box 1304 (taking into account any padding).

If the text being entered does not (or would not) fit within the available area of the text entry box 1302, application 504 may be configured to perform various operations. The present disclosure describes three different text entry modes of operation, which are referred to as a restrictive mode, a text adjustment mode, and a shape adjustment text entry mode. These are described further below. Application 504 may be configured to implement only one of these modes of operation. Alternatively, application 504 may be configured to offer two or more of these operation modes and provide a selection mechanism that allows a user to select a particular mode of operation. By way of example, a text entry mode control 1306 as depicted in FIG. 13 may be provided. In this particular example, control 1306 provides three control options corresponding to the three text entry modes described below. Alternative text entry mode controls are possible, and a text entry mode control need not provide for selection between all three options that are described.

Where different modes of operation are provided, application 504 determines the text entry mode of operation that is active (e.g. due to being the default mode of operation or being selected by a user) at 1212.

If the restrictive text entry mode is active, processing proceeds to 1214. In this case, application 504 restricts text that would not fit in the text entry box 1302 (at its current size) from being entered. If a character entered by the user would result in the text occupying more than the available text entry box space, application 504 may be configured to ignore that character. Alternatively, if a character entered by the user would result in the text occupying more than the available text entry box space, application 504 may be configured to truncate the text entered. Application may additionally add a truncation indicator to the text that indicates truncation has been performed (e.g. an ellipsis or other display cue). Optionally, application 504 may display a message indicating that no further space exists. In this case, a user may provide further input to rewrite the text, change text attributes (e.g. to a smaller font size or the like), change any padding (e.g. to reduce the padding), or manually resize the shape 1102 to make it (and, therefore, the text entry box 1302) larger.

If the text adjustment text entry mode is active, processing proceeds to 1216. In this case, application 504 is configured to automatically adjust (or attempt to adjust) text attributes if the text being entered will not (with the originally defined text attributes) fit within the available area of the text entry box 1302. In this mode of operation, when the text that has been entered occupies (or would occupy) the available area of the text entry box 1302, application 504 automatically selects a smaller font size for the text (e.g. the next font size down from the current font size). At the smaller font size the text may then fit in the text entry box 1302. If the user continues to enter text so that even at the smaller font size the entered text would exceed the available area in the text entry box 1302, application 504 may select a still further smaller font size and apply that font size to the text. As text is entered, application 504 may be configured to progressively select and apply smaller font sizes up to a defined minimum font size (e.g. 6 pt or an alternative minimum).

If the shape adjustment text entry mode is active, processing proceeds to 1218. In this case, application 504 is configured to automatically resize the shape 1102 (and, therefore, the text entry box 1302) if the text that is entered does/would not (with the originally defined text attributes) fit within the available area of the text entry box 1302. Notably, in this mode of operation application 504 resizes the deformable text shape 1102 as a whole. While this has the result of also resizing the text entry box 1302, resizing the shape 1102 is not the same as directly resizing text entry box 1302 (which would not result in the shape as a whole being resized).

In the shape adjustment text entry mode, application 504 may be configured to automatically resize the shape at 1218 in various ways.

In one implementation, where text is entered that exceeds the available text entry box space, application 504 is configured to automatically scale the shape 1102 (i.e. so its original aspect ratio is maintained) to provide a resized text entry box 1302 that has sufficient space for the text being entered. For example, each time the entered text reaches the point of occupying the available area in the text entry box, application 504 may be configured to automatically resize the shape by performing a new scaling operation.

In an alternative implementation, where text is entered that exceeds the available text entry box space, application 504 is configured to automatically stretch the shape 1102 (i.e. so its original aspect ratio is not maintained) to provide a resized text entry box 1302 that has sufficient space for the text being entered. Generally speaking, this may involve application 504 determining a stretch direction (based on the text being entered) and then determining a target size for the automatic resizing operation.

Generally speaking, where application 504 is configured to automatically stretch a shape 1102 to accommodate text it may be configured to determine a stretch direction based on various factors including one or more of: a user (or system) preference for a vertical or horizontal stretch direction; a preference for vertical or horizontal stretch direction associated with the shape itself; the aspect ratio of the shape; a user (or system) preference as to whether text wrapping is to be performed or not; and/or other factors.

For example, if the text being entered by a user is too wide for the current width of the text entry box, application 504 may be configured determine the stretch direction to be vertical (effectively providing a text wrapping function). In this case application may always use the same vertical stretch direction (e.g. a downward (e.g. in the positive y) direction).

By way of further examples, application 504 may be configured to determine stretch directions as follows:

| Text direction | Condition | Text wrapping enabled? | Stretch direction |
|---|---|---|---|
| Left-to-right or right-to-left | Line of text too long | Yes | Downward (e.g. positive y) |
| Left-to-right | Line of text too long | No | Rightward (e.g. positive x) |
| Right-to-left | Line of text too long | No | Leftward (e.g. negative x) |
| Left-to-right or right-to-left | Too many lines | Yes or No | Downward (e.g. positive y) |
| Top-to-bottom or bottom-to-top | Line of text too long | Yes | Leftward (e.g. negative x) |
| Top-to-bottom | Line of text too long | No | Downward (e.g. positive y) |
| Bottom-to-top | Line of text too long | No | Upward (e.g. negative y) |
| Top-to-bottom or bottom-to-top | Too many lines | Yes or No | Rightward (e.g. positive x) |

Application 504 may be configured to determine alternative stretch directions for any given scenario.

In the present embodiments, when automatically resizing a shape 1102 to accommodate text that is being entered, application 504 determines a targetTextHeight and/or a targetTextWidth value. This/these values are then used to perform the actual shape resizing as discussed below.

When stretching shape 1102 vertically to accommodate text, application 504 calculates a targetTextHeight value: i.e. a value indicating the height required by the text entry box 1302 to accommodate the text being entered. Application 504 may be configured to do so in various ways. For example, application 504 may be configured to render the text in memory (invisibly) and measure the height of the text as rendered. Alternatively, application 504 may calculate the targetTextHeight by: multiplying the existing text entry box height (or shape height) by a defined scaling factor (e.g. 1.1 or an alternative scaling factor); adding a defined number of pixels to the existing text entry box height (e.g. 5 or an alternative number of pixels); calculating a new height for the text entry box based on the text that is being entered—e.g. by adding the height of a line to the existing text entry box height (for horizontal text) or adding the width of a character to the existing text entry box height (for vertical text); or by alternative means.

When automatically stretching shape 1102 horizontally to accommodate text, application 504 calculates a targetTextWidth value: i.e. a value indicating the width required by the text entry box 1302 to accommodate the text being entered. Application 504 may be configured to do so in various ways. For example, application 504 may (again) be configured to render the text in memory (invisibly) and measure the width of the text as rendered. Alternatively, application 504 may calculate the targetTextWidth by: multiplying the existing text entry box width (or shape width) by a defined scaling factor (e.g. 1.1 or an alternative scaling factor); adding a defined number of pixels to the existing text entry box width (e.g. 5 or an alternative number of pixels); calculating a new width for the text entry box based on the text that is being entered—e.g. adding the width of a character to the existing text entry box width (for horizontal text); by adding the height of a line to the existing text entry box width (for vertical text); or by alternative means.

When automatically scaling shape 1102 to accommodate text, application 504 may calculate either a targetTextHeight value (as described above) or a targetTextWidth value (as described above)—as the shape is being uniformly resized, a targetTextHeight can be used to calculate a targetTextWidth that maintains the shape's aspect ratio (or vice versa).

Resizing deformable text shapes is described further below (e.g. with respect to processing 1408 of FIG. 14). The operations performed when automatically resizing a shape 1102 to accommodate text that is being entered are similar to those described below and, generally speaking, involve calculating resized path data (e.g. per 1410) and calculating resized textbox data (e.g. per 1412). When automatically resizing a shape 1102 to accommodate text that is being entered, however, application 504 must perform alternative processing in order to determine the new target slice height or target slice width that will be used for the resizing operation.

For example, if the shape 1102 is being automatically stretched vertically, application 504 calculates a target slice height (targetSliceHeight) that solves for the following equation:

$$\text{deform}(textSourceTop, a, b_0, a + targetSliceHeight) + targetTextHeight =$$
$$\text{deform}(textSourceTop + textSourceHeight, a, b_0, a + targetSliceHeight)$$

Where:
deform is the function described above;
a is the coordinate of the upper slice boundary (e.g. slice top as defined by the slice data, as described above, see FIG. 4);
$b_0$ is the coordinate of the lower slice boundary in the initial state (e.g. slice top+slice height as defined by the slice data, as described above, see FIG. 4);
textSourceTop is the defined top edge of the textbox in the initial coordinate space (e.g. textbox top edge as defined by the textbox data);
textSourceHeight is the defined height of the textbox in the initial coordinate space (e.g. textbox height as defined by the textbox data);

targetTextHeight is the height required by the textbox (determined by application 504 as discussed above).

Conversely, if the shape 1102 is being automatically stretched horizontally, application 504 calculates a target slice width (targetSliceWidth) that solves for the following equation:

$$\text{deform}(textSourceLeft, a, b_0, a + targetSliceWidth) + targetTextWidth =$$
$$\text{deform}(textSourceLeft + textSourceWidth, a, b_0, a + targetSliceWidth)$$

Where:
deform is the function described above;
a is the coordinate of the left slice boundary (e.g. the slice left as defined by the slice data, as described above);
$b_0$ is the coordinate of the right slice boundary in the initial state (e.g. slice left+slice width as defined by the slice data, as described above);
textSourceLeft is the defined left edge of the textbox in the initial coordinate space (e.g. textbox left edge as defined by the textbox data);
textSourceWidth is the defined width of the textbox in the initial coordinate space (e.g. textbox width as defined by the textbox data);
targetTextWidth is the width required by the textbox (determined by application 504 as discussed above).

In the above examples, the equations used to calculate target slice height and target slice width are non-linear. In the present embodiments, application 504 is configured to use Newton's method to solve these equations in a maximum of 3 iterations. Application 504 may, however, be configured to solve these equations in alternative ways (e.g. via the finite difference method or an alternative approach).

Once the target slice height and/or target slice width have been calculated, application 504 uses this/these values to resize the shape (and, therefore, the shape's textbox) as described below with reference to operation 1408 of FIG. 14.

At 1220, application 504 saves the text that has been entered by the user. In the present example, this involves updating the design data for the design to associate the entered text with the deformable text shape it has been added to. Continuing with the example data format described above, updating the design may involve updating the text attribute of the deformable text shape's element record. Application 504 may save text at 1220 at various times. For example, application 504 may be configured to save text as it is entered. Alternatively, application 504 may be configured to save text on completion of the text entry operation. Application 504 may determine that the text entry operation has been completed in various ways, for example: by detecting that the user has selected another design element; by detecting user operation of a 'save text' control; or by determining that an alternative event has occurred.

Once text has been added to a deformable text shape, a user may amend the text (and/or delete it entirely) by the same (or a similar) process as that described above.

Deformable Text Shape Use: Resizing a Deformable Text Shape

Once a deformable text shape has been added to a design, a user may resize the shape. An example process 1400 for resizing a deformable text shape will be described. In this section, reference to a shape is to be taken as reference to a deformable text shape.

At 1402, and if the shape is not already selected, application 504 receives user input selecting a deformable text shape 1102. This may, for example, be user input clicking on or contacting the shape 1102 on the canvas 1010.

As described above, on detecting selection of shape 1102 application 504 may display a bounding box 1114 and resize controls 1106/1108.

In the present embodiment, and if not already displayed, application 504 displays resizing controls at 1404. Resizing controls may be displayed in response to the input selecting the deformable text shape. Example resizing controls are described above with reference to FIG. 11, and may include one or more scale controls such as 1106 and/or one or more stretch controls such as 1108. Additional and/or alternative resizing controls may be provided. As one other example, application 504 may display a shape parameter interface (not shown) that is similar to interface 864 described above and allows a user to specify (via numeric values) a new width and/or height for the shape.

At 1406, application 504 receives user input to resize the selected shape 1102. This may be referred to as resizing input. Generally speaking, the resizing input serves to change the width and/or height of the selected shape's viewbox. This, in turn, causes recalculation of the shape's path, slice box, and textbox.

Various resizing inputs are possible. For example, user interaction with a resize control 1106/1108 (by dragging or moving a given resize control) may be a resizing input. As another example, specifying a new width or height via a shape parameter interface (not shown) may be a resizing input. Additional and/or alternative resizing inputs are possible.

In the present examples, application 504 provides for two different types of resize input: a scale input and a stretch input.

A scale input is input that causes the shape 1102 to be resized uniformly so that its original aspect ratio is maintained. A stretch input is input that causes the shape 1102 to be resized non-uniformly so that its original aspect ratio is not maintained. In the present example, a scale input may be performed by moving or dragging a scale control 1106 and a stretch input may be performed by moving or dragging a stretch control 1108. Specifically, a user may:

define a new shape width and height, e.g. by dragging or moving a scale control 1106 (e.g. control 1106A, a1106B, 1106C or 1106D) outwardly (away from the shape's centre) to uniformly enlarge the shape's size or inwardly (towards the shape's centre) to uniformly decrease the shape's size;

define a new shape height, e.g. by dragging or moving stretch control 1108A upwardly (outwardly) to stretch the shape 1102 vertically or downwardly (inwardly) to compress the shape 1102 vertically, neither operation changing the width of the shape 1102;

define a new shape width, e.g. by dragging or moving stretch control 1108B to the left (inwardly) to compress the shape 1102 horizontally or to the right (outwardly) to stretch the shape 1102 horizontally, neither operation changing the height of the shape 1102;

define a new shape height, e.g. by dragging or moving stretch control 1108C upwardly (inwardly) to compress the shape 1102 vertically or downwardly (outwardly) to stretch the shape 1102 vertically, neither operation changing the width of the shape 1102; or define a new shape width, e.g. by dragging or moving stretch control 1108D to the left (outwardly) to stretch the shape 1102 horizontally or to the right (inwardly) to compress the shape 1102 horizontally, neither operation changing the height of the shape 1102.

In the present embodiments, while resizing input is received application 504 performs various operations to resize the shape 1102.

At 1408, application 504 calculates resized shape data based on the resizing input. In the present embodiment, this involves calculating resized path data (at 1410) and resized textbox data (at 1412).

Application 504 may be configured to calculate resized path data using known algorithms for resizing deformable shapes (e.g. 9-slice shapes).

Generally speaking, if the shape 1102 has been stretched vertically such that its height (and the height of the shape's original viewbox) has changed, application 504 will calculate a target slice height.

Where the shape is being manually resized in a vertical direction, application 504 may calculate the target slice height based on the resizing input (and, in particular, on a new viewbox height that results from the resizing input) as described above—e.g. by solving the following for target slice height:

target slice height−original slice height=new viewbox height−original viewbox height Where the shape is being automatically resized in a vertical direction (e.g. to accommodate text), application 504 may calculate the target slice height as described above (with reference to 1218 of FIG. 12)—e.g. by solving the following for targetSliceHeight:

deform $(\textit{textSourceTop}, a, b_0, a + \textit{targetSliceHeight}) + \textit{targetTextHeight} =$ deform $(\textit{textSourceTop} + \textit{textSourceHeight}, a, b_0, a + \textit{targetSliceHeight})$ Application 504 then uses the target slice height to translate original y coordinates of the shape's path data to new y coordinates, for example by the deform function described above:

$$\text{deform}(y, a, b_0, b_1) = \begin{cases} y & \text{if } y \leq a \\ \frac{b_1 - a}{b_0 - a}(y - a) + a & \text{if } a < y < b_0 \\ y + b_1 - b_0 & \text{if } y \geq b_0 \end{cases}$$

If the shape 1102 has been stretched horizontally such that its width (and the width of the shape's original viewbox) has changed, application 504 will calculate a target slice width.

Where the shape is being manually resized in a horizontal direction, application 504 may calculate the target slice width based on the resizing input (and, in particular, on a new viewbox width that results from the resizing input) as described above—e.g. by solving the following for target slice width:

target slice width − original slice width = new viewbox width − original viewbox width

Where the shape is being automatically resized in a horizontal direction (e.g. to accommodate text), application 504 may calculate the target slice width as described above (with reference to 1218 of FIG. 12)—e.g. by solving the following for targetSliceWidth:

deform $(\textit{textSourceLeft}, a, b_0, a + \textit{targetSliceWidth}) + \textit{targetTextWidth} =$ deform $(\textit{textSourceLeft} + \textit{textSourceWidth}, a, b_0, a + \textit{targetSliceWidth})$ Application 504 then uses the target slice width to translate original x coordinates of the shape's path data to new x coordinates, for example by the deform function described above:

$$\text{deform}(x, a, b_0, b_1) = \begin{cases} x & \text{if } x \leq a \\ \frac{b_1 - a}{b_0 - a}(x - a) + a & \text{if } a < x < b_0 \\ x + b_1 - b_0 & \text{if } x \geq b_0 \end{cases}$$

If the shape 1102 has been scaled (i.e. so aspect ratio is maintained), application 504renders the shape using a scaling transformation from the view box coordinate space to the design coordinate space (e.g. the canvas or display).

To calculate resized textbox data, application 504 uses the same approach that is used to calculate the resized path data. For example, application 504 may calculate new positions for each of the four corners of the textbox (and from those positions determine the new textbox top, left, width, and height values).

For example, if the shape 1102 has been stretched vertically, application 504 will calculate a target slice height and then apply the deform function as described above to calculate new minY 304 and maxY 310 coordinates for the resized textbox. This may be done by: calculating a new textbox minY by using the original textbox minY coordinate as input to the deform function; and calculating a new textbox maxY by using the original textbox maxY coordinate (which may require adding the original textbox height to the original textbox minY) to calculate a new textbox max Y using the deform function. For vertical stretching there is no need to recalculate any x coordinates: these remain the same.

If the shape 1102 has been stretched horizontally, application 504 will calculate a target slice width and then apply the deform function as described above to calculate new minX 306 and maxX 314 coordinates for the resized textbox. This may be done by: calculating a new textbox minX by using the original textbox minX coordinate as input to the deform function; and calculating a new textbox maxX by using the original textbox maxX coordinate (which may require adding the original textbox width to the original textbox minX) to calculate a new textbox max X using the deform function. For horizontal stretching there is no need to recalculate any y coordinates: these remain the same.

In the present embodiment, once resized shape data has been calculated application 504 determines if there is text associated with the shape at 1414. If so, processing proceeds to 1416. If not, processing proceeds to 1428.

At 1416, application 504 reflows the text associated with the shape 1102 based on the resized textbox (which may now have a greater width, a smaller width, a greater height, a smaller height, a greater width and a greater height, or a smaller width and a smaller height). Text reflowing may be performed according to known reflowing approaches.

At 1418, following text reflowing, application 504 determines whether the reflowed text exceeds the available area provided by the now resized textbox. This is similar to operation 1210 described above.

If the reflowed text does not fit within the available area of the resized textbox, application 504 may be configured to perform various operations. The present disclosure describes three different shape resizing modes of operation, which are referred to as a restrictive mode, a text adjustment mode, and a shape adjustment mode. (These are similar to the text entry modes of operation described with reference to FIG. 10 above). Application 504 may be configured to implement only one of these shape resizing modes. Alternatively, application 504 may be configured to offer two or more of these shape resizing modes and provide a selection mechanism that allows a user to select a particular mode of operation. By way of example, a shape resizing mode control (not shown, but similar to control 1306 depicted in FIG. 13) may be provided which allows a user to select a particular shape resizing mode of operation.

In the present embodiment, application 504 determines the shape resizing mode of operation that is active (e.g. due to being the default mode of operation or being selected by a user) at 1420.

If the restrictive shape resizing mode is active, processing proceeds to 1422. In this case, if the text exceeds the available space within the resized textbox, application 504 truncates the text so that it fits in the resized textbox. Application 504 may additionally add a truncation indicator to the text that indicates truncation has been performed (e.g. an ellipsis or other display cue). Optionally, application 504 may display a message indicating that the text has been truncated.

By way of alternative, if the restrictive shape resizing mode is active, at 1422 application 504 may instead be configured reject the resizing input (e.g. so that any resizing input that would result in the resized textbox not accommodating the text is ignored).

If the text adjustment shape resizing mode is active, processing proceeds to 1424. In this case, application 504 is configured to automatically adjust (or attempt to adjust) text attributes so that the text will fit within the available area of the resized textbox. In this mode of operation, when the text exceeds (or would exceed) the available area of the resized text box, application 504 automatically selects a smaller font size for the text (e.g. a font size at which the text would fit within the resized textbox). Application 504 may be configured with a minimum font size (e.g. 6 pt or an alternative minimum) which, if reached, causes application to either truncate the text or reject the resizing input that would cause a font size below the minimum (e.g. per the restrictive mode of operation described with reference to 1422).

If the shape adjustment shape resizing mode is active, processing proceeds to 1426. In this case, application 504 is configured to automatically resize the shape 1102 (and, therefore, the textbox) so that the text will fit within the available space of the resized textbox. This automatic resizing is automatically performed by application 504 and is additional to the resizing that is caused by the user's resizing input (which may be referred to as the user input based resizing to distinguish it from the automatic resizing that may be performed by application 502).

To illustrate the shape adjustment shape resizing mode, consider for example resizing input that reduces the width of the shrink the shape 1102 (and, therefore, its textbox). In this case, and assuming text wrapping occurs, reflowing the text (at 1416) may cause the text to occupy more lines that it did originally. If the number of text lines no longer fits within the original available height of the resized textbox, application 504 will automatically increase the height of the shape (and therefore textbox) so that the textbox accommodates the new (larger) number of lines that are required. As can be seen, in this example the user's resizing input is to reducing the shape's width. In accordance with the input application 504 horizontally shrinks the shape (the user input resizing), but also increases the shape's height by vertically stretching it (the automatic resizing).

The processing performed by application 504 in the shape adjustment shape resizing mode is very similar to the processing performed in the shape adjustment text entry mode (described above with reference to 1218). The detail will not be repeated, but in brief this involves application 504 determining a stretch direction and automatically stretching the shape in that direction so that the available space of the textbox will accommodate the text. Generally speaking, in the shape adjustment shape resizing mode the stretch direction determined by application 504 will be in the opposite dimension to that which the user is adjusting via the resizing input. E.g. if the user is reducing the shape's width (e.g. along the horizontal/x axis), then the stretch direction determined will be vertical—typically downward (e.g. the positive y direction) to accommodate additional lines created by word wrapping. Alternatively, if the user is reducing the shape's height (e.g. along the vertical/y axis), then the stretch direction determined will be horizontal—typically rightward (e.g. the positive x direction) so text can occupy a longer horizontal span. Once the stretch direction has been determined, application 504 determines a targetTextHeight or a targetTextWidth value which is then used to perform the automatic resizing (as has been described).

If, in the shape adjustment shape resizing mode, a point is reached where automatic resizing to accommodate the text is not possible, application 504 may be configured to either truncate the text or reject the resizing input (e.g. per the restrictive mode of operation described with reference to 1422). This may occur, for example, if a user is attempting to vertically shrink a shape to a size that results in the available height of the text box being less than the number of explicitly defined lines of text.

In some embodiments, application 504 may also (or alternatively) be configured to automatically resize text when the resizing operation causes the shape 1102 to be larger than its original size. In this case, application 504 may calculate the largest font size that results in the text filling the new textbox without encroaching into any padding or beyond the bounds of the new textbox.

At 1428, application 504 displays the resized shape. The resized shape is displayed based on the resized path data calculated at 1410 (which defines the shape itself), the resized textbox calculated at 1412 (which defines the position and size of the shapes textbox), any text reflowing performed at 1416, and/or any automatic text or shape adjustments performed at 1422, 1424, or 1426.

FIG. 15 provides example user interfaces that illustrate a shape resizing operation. Example UI (or partial UI) 1500 depicts the drawing region 1002 with canvas 1010 displaying a deformable text shape 1502 prior to a resizing operation. In example 1500, shape 1502 has had the text "Text that has been added to the shape by a user" added. In example UI 1500, the font size for the added text is 10 point. Further, in example 1500 application 504 is displaying the outline of the text entry box 1504 (based on the shape's textbox data) and padding 1506, though these need not be displayed.

Example UI (or partial UI) 1510 depicts example US 1500 following a resizing operation that has vertically stretched shape 1502. As a result, application 504 has calculated resized path data and resized textbox data to display resized shape 1502'. In example 1510. application 504 is also displaying the outline of the resized text entry box 1504' (based on the resized textbox data) and the textbox padding 1506' (in this example the padding width has not changed, but the length of the padding on the vertical edges has increased commensurately with the resized textbox data). Once again, application 504 need not display the textbox outline 1504 or padding 1506 (per example UI 1520 discussed below). In addition, in example UI 1510, application 504 has automatically resized the text associated with the shape 1502, the text now being 14 pt font size (as 15 pt font size would result in the text occupying a greater area than that available in the resized textbox 1504').

Example UI (or partial UI) 1520 depicts example UI 1510 without the outline of the resized text entry box 1504', the textbox padding 1506', the shape bounding box or the resize controls displayed.

At 1430, application 504 saves the resized shape. In the present example, this involves updating the design data for the design. Generally speaking, the design data is updated to record the new size of the shape, a new position for the shape (if the shape's position has been changed), and new font attributes for the shape text (if the font size has been changed).

In the context of the example element record described above, updating the design data may involve one or more of: recording a new width for the resized shape (if the resizing operation has changed the shape's width); recording a new height for the resized shape (if the resizing operation has changed the shape's width); recording a new origin/position x coordinate for the resized shape (if the resizing operation has changed the shape's original origin x); recording a new origin/position y coordinate for the resized shape (if the resizing operation has changed the shape's original origin y); recording a new font size for the shape's text (if the font size has been changed).

Application 504 may save the resized shape at 1430 at various times. For example, application 504 may be configured to save the shape during resizing input (e.g. at periodic intervals as new shape data is calculated). Alternatively, application 504 may be configured to save the resized shape on completion of the resizing operation. Application 504 may determine that the resizing operation has been completed in various ways, for example: by detecting that the user has completed dragging/moving a resizing control; detecting that a user has entered an explicit width or height value (e.g. via a shape parameter interface); detecting user operation of a 'save shape' control (displayed, for example, in control region 808); or by determining that an alternative event has occurred.

Additional, specific embodiments of the present disclosure are described in the following clauses by way of non-limiting example:

Clause 1. A computer implemented method for creating a deformable text shape, the method including:
receiving first user input defining a base shape, the base shape being a deformable shape that is defined by base shape data, the base shape data including path data defining an appearance of the base shape and slice data defining a slice box for the base shape;
receiving second user input defining a textbox;
generating textbox data defining the textbox; and
creating the deformable text shape by associating the textbox data with the base shape data.

Clause 2. The computer implemented method of clause 1, wherein the first user input includes input selecting an existing deformable shape to be the base shape.

Clause 3. The computer implemented method of clause 1, wherein the first user input includes:
path definition input that defines the path data; and
slice definition input that defines the slice data.

Clause 4. The computer implemented method of any one of clauses 1 to 3, further including displaying the base shape on a display, and wherein the second user input is user input that draws the textbox over the base shape.

Clause 5. The computer implemented method of clause 4, wherein the base shape data further includes viewbox data and displaying the base shape on the display includes displaying a viewbox boundaries based on the viewbox data.

Clause 6. The computer implemented method of clause 4 or clause 5, wherein displaying the base shape on the display includes displaying the slice box.

Clause 7. The computer implemented method of any one of clauses 1 to 6, further including: determining if the textbox is a valid textbox, and wherein:
creating the deformable text shape is only performed if the textbox is determined to be a valid textbox.

Clause 8. The computer implemented method of any one of clauses 1 to 6, further including:
determining if the textbox defined is a valid textbox; and
in response to determining that the textbox is not a valid textbox, foregoing creating the deformable text shape.

Clause 9. The computer implemented method of clause 7 or clause 8, wherein:
the slice data defines an upper slice, a lower slice, a left slice, and a right slice; and
determining if the textbox is a valid textbox includes determining that:
a top edge of the textbox is not positioned in the lower slice;
a bottom edge of the textbox is not positioned in the upper slice;
a left edge of the textbox is not positioned in the right slice; and
a right edge of the textbox is not positioned in the left slice.

Clause 10. The computer implemented method of any one of clauses 1 to 9, wherein the textbox data includes an x coordinate, a y coordinate, a width, and a height.

Clause 11. The computer implemented method of any one of clauses 1 to 9, wherein the textbox data includes a minimum x coordinate, a minimum y coordinate, a maximum x coordinate, and a maximum y coordinate.

Clause 12. A computer implemented method for resizing a deformable text shape, the method including:
receiving a shape selection user input selecting the deformable text shape, the deformable text shape defined by shape data that includes path data defining an original appearance of the deformable text shape, slice data defining an original slice box for the deformable text shape, viewbox data defining an original viewbox for the deformable text shape, and textbox data defining an original textbox for the deformable text shape;
receiving a shape resizing user input that resizes the viewbox of the deformable text shape;

in response to the shape resizing user input, calculating resized shape data by calculating resized path data and calculating resized textbox data; and displaying a resized deformable text shape in accordance with the resized shape data.

Clause 13. The computer implemented method of clause 12, wherein:

the shape resizing user input is a stretch input that defines a new shape width of the deformable text shape; and calculating the resized text box data includes:

calculating a target slice width based on the new shape width and the slice data, the target slice width being a width of the original slice box following the resizing user input; and using the target slice width to calculate the resized text box data.

Clause 14. The computer implemented method of clause 13, wherein calculating the resized text box data includes:

calculating a new text box minimum x based on the target slice width, the textbox data, and the slice data.

Clause 15. The computer implemented method of clause 13 or clause 14, wherein calculating the resized text box data includes:

calculating a new text box maximum x based on the target slice width, the textbox data, and the slice data.

Clause 16. The computer implemented method of clause 13 or clause 14, wherein calculating the resized text box data includes:

calculating a new text box width based on the target slice width, the textbox data, and the slice data.

Clause 17. The computer implemented method of clause 12, wherein:

the shape resizing user input is a stretch input that defines a new shape height of the deformable text shape; and calculating the resized text box data includes:

calculating a target slice height based on the new slice height and the slice data, the target slice height being a height of the original slice box following the resizing user input; and using the target slice height to calculate the resized text box data.

Clause 18. The computer implemented method of clause 17, wherein calculating the resized text box data includes:

calculating a new text box minimum y based on the target slice height, the textbox data, and the slice data.

Clause 19. The computer implemented method of clause 17 or clause 18, wherein calculating the resized text box data includes:

calculating a new text box maximum y based on the target slice height, the textbox data, and the slice data.

Clause 20. The computer implemented method of clause 17 or clause 18, wherein calculating the resized text box data includes:

calculating a new text box height based on the target slice height, the textbox data, and the slice data.

Clause 21. The computer implemented method of any one of clauses 12 to 20, wherein the deformable text shape is associated with text data and the method further includes:

determining if text defined by the text data fits within a resized textbox defined by the resized textbox data; and in response to determining that the text defined by the text data does not fit within the resized textbox, automatically changing a font size of the text so the text does fit within the resized textbox.

Clause 22. The computer implemented method of any one of clauses 12 to 20, wherein the deformable text shape is associated with text data and the method further includes:

determining if text defined by the text data fits within a resized textbox defined by the resized textbox data; and in response to determining that the text defined by the text data does not fit within the resized textbox, automatically resizing the shape so the text does fit within the resized textbox.

Clause 23. The computer implemented method of clause 22, wherein:

the shape resizing user input is input to reduce a width of the deformable text shape; and automatically resizing the shape so the text does fit within the resized textbox includes automatically increasing a height of the deformable text shape.

Clause 24. The computer implemented method of clause 22, wherein:

the shape resizing user input is input to reduce a height of the deformable text shape; and automatically resizing the shape so the text does fit within the resized textbox includes automatically increasing a width of the deformable text shape.

Clause 25. A computer implemented method for resizing a deformable text shape, the method including:

receiving a shape selection user input selecting the deformable text shape, the deformable text shape defined by shape data that includes path data defining an original appearance of the deformable text shape, slice data defining an original slice box for the deformable text shape, viewbox data defining an original viewbox for the deformable text shape, and textbox data defining an original textbox for the deformable text shape, the original textbox defining an available text entry area;

receiving a text entry input defining text;

determining whether the text fits within the available text entry area; and in response determining that the text does not fit within the available text entry area, resizing the deformable text shape to provide a resized textbox that accommodate the text by:

calculating resized shape data by calculating resized path data and calculating resized textbox data; and displaying a resized deformable text shape in accordance with the resized shape data.

Clause 26. The computer implemented method of clause 25, wherein resizing the deformable text shape includes:

determining a new textbox width, the new textbox width sufficient to accommodate the text; and calculating the resized path data based on new text box width; and calculating the resized textbox data based on the new text box width.

Clause 27. The computer implemented method of clause 26, wherein resizing the deformable text shape includes:

calculating, based on the new textbox width, a target slice width, the target slice width being a new width of the original slice box following resizing of the deformable text shape;

calculating the resized path data based on the target slice width; and calculating the resized textbox data using the target slice width.

Clause 28. The computer implemented method of any one of clauses 25 to 27, wherein resizing the deformable text shape includes:

determining a new textbox height, the new textbox height sufficient to accommodate the text; and calculating the resized path data based on new text box height; and calculating the resized textbox data based on the new text box height.

Clause 29. The computer implemented method of clause 28, wherein resizing the deformable text shape includes:

calculating, based on the new textbox height, a target slice height, the target slice height being a new height of the original slice box following resizing of the deformable text shape;

calculating the resized path data based on the target slice height; and calculating the resized textbox data using the target slice height.

Clause 30. The computer implemented method of any one of clauses 12 to 29, wherein the deformable text shape is created by the computer implemented method of any one of clauses 1 to 11.

Clause 31. A computer processing system including:

a processing unit; and a non-transient computer-readable storage medium storing instructions, which when executed by the processing unit, cause the processing unit to perform a method according to any one of clauses 1 to 30.

Clause 32. A non-transient storage medium storing instructions executable by processing unit to cause the processing unit to perform a method according to any one of clauses 1 to 30.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by (or in conjunction with) different applications running on the same or different computer processing systems.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

Unless otherwise stated, the terms "include" and "comprise" (and variations thereof such as "including", "includes", "comprising", "comprises", "comprised" and the like) are used inclusively and do not exclude further features, components, integers, steps, or elements.

Unless required otherwise by context, the terms "first", "second", etc. are used to differentiate between various elements and features and not in an ordinal sense. For example, a first user input could be termed a second user input, and, similarly, a second user input could be termed a first user input, without departing from the scope of the various described examples. By way of further example, in certain cases a second user input could occur before a first user input (or without a first user input existing).

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for creating a deformable text shape, the method including:

receiving, at a user interface, first user input defining a base shape, wherein the base shape is a deformable 9-slice shape that is defined by base shape data that includes:

path data defining perimeter and appearance of the base shape;

viewbox data defining a base shape viewbox; and slice data that defines an upper slice, a lower slice, a left slice, a right slice, and a slice box for the base shape, wherein the slice data can be used to calculate new path data that defines a new perimeter and appearance of the base shape if the base shape is deformed in a resizing operation;

receiving second user input defining a textbox, wherein the textbox is positioned within the base shape viewbox;

generating textbox data defining the textbox;

determining, by a processor, that the textbox is a valid textbox, wherein determining that the textbox is the valid textbox includes determining that: a top edge of the textbox is not positioned in the lower slice; a bottom edge of the textbox is not positioned in the upper slice; a left edge of the textbox is not positioned in the right slice; and a right edge of the textbox is not positioned in the left slice;

in response to determining that the text box is the valid textbox, creating the deformable text shape by associating the textbox data with the base shape data, wherein the path data defines a perimeter and appearance of the deformable text shape, the viewbox data defines a viewbox of the deformable text shape, the slice data defines a slice box of the deformable text shape, and the textbox data defines a text entry area of the deformable text shape; and making the deformable text shape available to a user of an application to add the deformable text shape to a design.

2. The computer implemented method of claim 1, wherein the first user input includes input selecting an existing deformable shape to be the base shape.

3. The computer implemented method of claim 1, wherein the first user input includes:

path definition input that defines the path data; and slice definition input that defines the slice data.

4. The computer implemented method of claim 1, further including displaying the base shape on a display, and wherein the second user input is user input that draws the textbox over the base shape.

5. The computer implemented method of claim 4, wherein displaying the base shape on the display includes displaying viewbox boundaries based on the viewbox data.

6. The computer implemented method of claim 4, wherein displaying the base shape on the display includes displaying the slice box.

7. The computer implemented method of claim 1, wherein the textbox data includes an x coordinate, a y coordinate, a width, and a height.

8. The computer implemented method of claim 1, wherein the textbox data includes a minimum x coordinate, a minimum y coordinate, a maximum x coordinate, and a maximum y coordinate.

9. The computer implemented method of claim 1, wherein creating the deformable text shape includes generating a single dataset that includes the path data, viewbox data, slice data, and textbox data.

10. The computer implemented method of claim 1, wherein the path data, viewbox data, slice data, and textbox data are defined in a common coordinate space that is different to a design coordinate space of a design that the deformable text shape is added to.

11. The computer implemented method of claim 1, wherein making the deformable text shape available to the user of an application includes causing a selectable preview of the deformable text shape to be displayed.

12. A computer processing system including:
a processing unit; and
a non-transient computer-readable storage medium storing instructions, which when executed by the processing unit, cause the processing unit to perform a method for creating a deformable text shape, the method including:
receiving first user input defining a base shape, wherein the base shape is a deformable 9-slice shape that is defined by base shape data that includes:
path data defining a perimeter and appearance of the base shape;
viewbox data defining a base shape viewbox; and
slice data that defines an upper slice, a lower slice, a left slice, a right slice, and a slice box for the base shape, wherein the slice data can be used to calculate new path data that defines a new perimeter and appearance of the base shape if the base shape is deformed in a resizing operation;
receiving second user input defining a textbox, wherein the textbox is positioned within the base shape viewbox;
generating textbox data defining the textbox;
determining that the textbox is a valid textbox, wherein determining that the textbox is the valid textbox includes determining that: a top edge of the textbox is not positioned in the lower slice; a bottom edge of the textbox is not positioned in the upper slice; a left edge of the textbox is not positioned in the right slice; and a right edge of the textbox is not positioned in the left slice;
in response to determining that the textbox is a valid textbox, creating the deformable text shape by associating the textbox data with the base shape data, wherein the path data defines a perimeter and appearance of the deformable text shape, the viewbox data defines a viewbox of the deformable text shape, the slice data defines a slice box of the deformable text shape, and the textbox data defines a text entry area of the deformable text shape; and
making the deformable text shape available to a user of an application to add the deformable text shape to a design.

13. The computer processing system of claim 12, wherein the method further includes displaying the base shape on a display, and wherein the second user input is user input that draws the textbox over the base shape.

14. The computer processing system of claim 13, wherein displaying the base shape on the display includes displaying viewbox boundaries based on the viewbox data.

15. The computer processing system of claim 12, wherein the first user input includes input selecting an existing deformable shape to be the base shape.

16. The computer processing system of claim 12, wherein the first user input includes:
path definition input that defines the path data; and
slice definition input that defines the slice data.

17. A non-transient storage medium storing instructions executable by processing unit to cause the processing unit to perform a method for creating a deformable text shape, the method including:
receiving, at a user interface, first user input defining a base shape, wherein the base shape is a deformable shape that is defined by base shape data that includes path data defining a perimeter and appearance of the base shape;
viewbox data defining a base shape viewbox; and
slice data that defines an upper slice, a lower slice, a left slice, a right slice, and a slice box for the base shape, wherein the slice data can be used to calculate new path data that defines a new perimeter and appearance of the base shape if the base shape is deformed in a resizing operation;
receiving second user input defining a textbox, wherein the textbox is positioned within the base shape viewbox;
generating textbox data defining the textbox;
determining, by the processing, unit that the textbox is a valid textbox, wherein determining that the textbox is the valid textbox includes determining that: a top edge of the textbox is not positioned in the lower slice; a bottom edge of the textbox is not positioned in the upper slice; a left edge of the textbox is not positioned in the right slice; and a right edge of the textbox is not positioned in the left slice;
in response to determining that the textbox is the valid textbox, creating the deformable text shape by associating the textbox data with the base shape data, wherein the path data defines perimeter and appearance of the deformable text shape, the viewbox data defines a viewbox of the deformable text shape, the slice data defines a slice box of the deformable text shape, and the textbox data defines a text entry area of the deformable text shape; and
making the deformable text shape available to a user of an application to add the deformable text shape to a design.

18. The non-transient storage medium of claim 17, wherein the method further includes displaying the base shape on a display, and wherein the second user input is user input that draws the textbox over the base shape.

19. The non-transient storage medium of claim 17, wherein the first user input includes input selecting an existing deformable shape to be the base shape.

20. The non-transient storage medium of claim 17, wherein the first user input includes:
path definition input that defines the path data; and
slice definition input that defines the slice data.

* * * * *